(12) United States Patent
Yang

(10) Patent No.: US 10,909,012 B2
(45) Date of Patent: Feb. 2, 2021

(54) SYSTEM HAVING PERSISTENT MEMORY

(71) Applicant: H3 Platform, Inc., New Taipei (TW)

(72) Inventor: Yuan-Chih Yang, Taichung (TW)

(73) Assignee: H3 Platform, Inc., New Taipei (TW)

( * ) Notice: Subject to any disclaimer, the term of this patent is extended or adjusted under 35 U.S.C. 154(b) by 204 days.

(21) Appl. No.: 16/188,195

(22) Filed: Nov. 12, 2018

(65) Prior Publication Data
US 2020/0151104 A1 May 14, 2020

(51) Int. Cl.
| | |
|---|---|
| G06F 11/00 | (2006.01) |
| G06F 11/20 | (2006.01) |
| G06F 12/0868 | (2016.01) |
| G06F 12/0804 | (2016.01) |
| G06F 13/16 | (2006.01) |
| G06F 13/42 | (2006.01) |

(52) U.S. Cl.
CPC ...... *G06F 11/2094* (2013.01); *G06F 12/0804* (2013.01); *G06F 12/0868* (2013.01); *G06F 13/1668* (2013.01); *G06F 13/4221* (2013.01); *G06F 13/4282* (2013.01); *G06F 2201/805* (2013.01); *G06F 2201/82* (2013.01); *G06F 2212/1032* (2013.01); *G06F 2212/1044* (2013.01); *G06F 2213/0024* (2013.01); *G06F 2213/0026* (2013.01)

(58) Field of Classification Search
CPC ............ G06F 11/2094; G06F 12/0804; G06F 12/0868; G06F 13/1668; G06F 13/4221; G06F 13/4282
See application file for complete search history.

(56) References Cited

U.S. PATENT DOCUMENTS

| | | | |
|---|---|---|---|
| 5,287,481 A | * | 2/1994 | Lin ..................... G06F 12/0891 |
| | | | 711/135 |
| 9,223,734 B2 | | 12/2015 | Subramaniyan et al. |
| 9,721,660 B2 | | 8/2017 | Kelly et al. |

(Continued)

OTHER PUBLICATIONS

Swaminathan Sundararaman et al., "Towards software defined persistent memory: rethinking software support for heterogenous memory architectures," INFLOW '15, Oct. 2015, pp. 1-10.

(Continued)

*Primary Examiner* — Joshua P Lottich
(74) *Attorney, Agent, or Firm* — JCIPRNET

(57) ABSTRACT

A system for managing software-defined persistent memory includes a CPU, a PCIe switch, one or more random access memory modules, and one or more NVMe SSDs. The PCIe switch is configured to communicate with one or more host devices. The CPU and the PCIe switch are configured to generate, for each host device, a persistent memory controller data structure that has configuration data to enable the CPU and the PCIe switch to emulate a persistent memory controller when interacting with the host device. The CPU and the PCIe switch are configured to receive instructions from the one or more host devices and persistently store write data in one or more NVMe SSDs or retrieve read data from the one or more NVMe SSDs based on the instructions from the one or more host devices, and use at least a portion of the RAM as cache memory to temporarily store at least one of the read data from the one or more NVMe SSDs or the write data intended to be persistently stored in the one or more NVMe SSDs.

20 Claims, 10 Drawing Sheets

(56) References Cited

U.S. PATENT DOCUMENTS

| | | | |
|---|---|---|---|
| 2010/0250856 A1* | 9/2010 | Owen | G06F 12/084 |
| | | | 711/128 |
| 2014/0195634 A1 | 7/2014 | Kishore et al. | |
| 2016/0253093 A1* | 9/2016 | Zhang | G06F 13/28 |
| | | | 710/308 |
| 2017/0038982 A1* | 2/2017 | Lemberg | G06F 3/0613 |
| 2017/0177528 A1 | 6/2017 | Harriman et al. | |
| 2018/0181519 A1 | 6/2018 | Cheng | |

OTHER PUBLICATIONS

Paul Grun et al., "Persistent Memory Over Fabrics," SNIA PM Summit, San Jose, CA, Jan. 24, 2018, pp. 1-47.

* cited by examiner

SYSTEM HAVING PERSISTENT MEMORY

TECHNICAL FIELD

This subject matter is generally related to systems having persistent memory.

BACKGROUND

For example, a computer system can include dynamic random access memory (DRAM) and a non-volatile storage device (e.g., solid state drive (SSD)). The dynamic random access memory allows access to data at a high speed, and the non-volatile storage device allows data to be persistently stored when the power is turned off. A central processing unit (CPU) accesses dynamic random access memory through a memory bus (e.g., using a double data rate (DDR), DDR2, DDR3, or DDR4 protocol), and accesses the solid state drive through a peripheral bus, such as a peripheral component interconnect express (PCIe) bus. Dynamic random access memory modules are typically byte-addressable devices, whereas the solid state drives are typically block-addressable devices. The protocols for accessing dynamic random access memory and the protocols for accessing solid state drives are typically different due to the different capabilities and characteristics between dynamic random access memory and solid state drive.

A persistent memory module that includes a combination of dynamic random access memory and non-volatile storage can potentially provide access to data storage at a speed faster than the solid state drive and at a lower price per storage unit compared to dynamic random access memory. In some examples, the persistent memory module is configured to be connected to the system in a way similar to dynamic random access memory, which allows the central processing unit to access the persistent memory module in a manner similar to accessing dynamic random access memory. For example, a non-volatile dual in-line memory module (NVDIMM) that includes dynamic random access memory and non-volatile storage, such as NAND Flash, can be installed in a dual in-line memory module slot of a computer motherboard. This allows the computer system to use the dynamic random access memory of the non-volatile dual in-line memory module during normal operation to enable fast data access, and persistently store data in the non-volatile storage of the non-volatile dual in-line memory module during power shutdown or failure.

SUMMARY

In a general aspect, a system for managing software-defined persistent memory includes a central processing unit; one or more first input/output ports configured to receive one or more random access memory (RAM) modules each having random access memory, in which the one or more first input/output ports are electrically coupled to a memory bus that is accessible to the central processing unit; and one or more second input/output ports configured to receive one or more block-addressable non-volatile storage devices. The system includes an interface switch configured to communicate with one or more host devices through one or more first data links, in which the central processing unit and the interface switch are configured to generate, for each host device, a persistent memory controller data structure that is associated with the corresponding host device. The central processing unit and the interface switch are configured emulate a persistent memory controller when interacting with the host device. The persistent memory controller data structure includes configuration data to enable the central processing unit and the interface switch to emulate the persistent memory controller. The central processing unit and the interface switch are configured to receive instructions from the one or more host devices and persistently store write data in one or more block-addressable non-volatile storage devices or retrieve read data from the one or more block-addressable non-volatile storage devices based on the instructions from the one or more host devices, and use at least a portion of the random access memory as cache memory to temporarily store at least one of the read data from the one or more block-addressable non-volatile storage devices or the write data intended to be persistently stored in the one or more block-addressable non-volatile storage devices.

Implementations can include one or more of the following features. The instructions from the host device can include instructions designed to access a byte-addressable persistent memory module.

The first data links can include at least one of PCIe links, Thunderbolt™ links, NVLinks, CCIX links, OpenCAPI links, or Gen-Z links.

The one or more block-addressable non-volatile storage devices can communicate with the interface switch or the central processing unit through at least one of PCIe links, Thunderbolt™ links, NVLinks, CCIX links, OpenCAPI links, or Gen-Z links.

The first data links can include PCIe links, the one or more block-addressable non-volatile storage devices can communicate with the interface switch or the central processing unit through PCIe links, and the interface switch can include a PCIe switch.

The central processing unit can be configured to, upon receiving an interrupt signal indicating power failure, perform an emergency shutdown process that includes flushing cached data to the one or more non-volatile storage devices.

The emergency shutdown process can include disabling the PCIe link associated with each host device to prevent receiving additional data through the PCIe link from the host device.

Each of at least some of the one or more non-volatile storage devices can have a write cache implemented using random access memory, and the emergency shutdown process can include disabling the one or more write caches.

The emergency shutdown process can include flushing write data of memory write transaction layer packets to PCI memory space.

The emergency shutdown process can include flushing data in PCI memory space to at least one corresponding non-volatile storage device.

The emergency shutdown process can include flushing data in a controller memory buffer cache to at least one corresponding non-volatile storage device.

The apparatus can include a power failure detector configured to detect power failure and generate the interrupt signal indicating power failure.

The non-volatile storage devices can include NVM Express® solid state drives.

The central processing unit can be electrically coupled to the PCIe switch using a PCIe link.

The instructions from the host devices can include instructions designed to access non-volatile dual in-line memory modules.

The apparatus can include super capacitors to provide power to at least one of the central processing unit, random access memory, interface switch, or the non-volatile storage devices during the emergency shutdown process.

Each of at least one of the non-volatile storage devices can include a controller memory buffer (CMB) implemented using dynamic random access memory, a portion of the random access memory is configured as controller memory buffer cache, and the central processing unit and the interface switch are configured to use the cache memory and the controller memory buffer cache to temporarily store the read data and/or the write data.

The controller memory buffer can include error-correction code memory, and the non-volatile storage device can be configured to send the central processing unit an error message transaction layer packet when there is an error in the data associated with the controller memory buffer.

The central processing unit can generate a controller memory buffer cache data structure in the random access memory, and the controller memory buffer cache data structure can include information about a corresponding controller memory buffer and a location in the controller memory buffer where cache data is stored.

The host devices can include at least one of server computers, desktop computers, laptop computers, tablet computers, cameras, or mobile phones.

The PCIe switch can be configured to redirect at least one of configuration, memory, or message request transaction layer packets (TLPs) received from each host device to the central processing unit, and the central processing unit is configured to process the at least one of the configuration, memory, or message request transaction layer packets.

The central processing unit can be configured to send at least one of configuration completion, memory read completion, or message request transaction layer packets (TLPs) to the one or more host devices.

The central processing unit can be configured to send message signaled interrupts to at least one of the one or more host devices to notify the host device of hotplug or hot removal of the corresponding persistent memory controller data structure.

The persistent memory controller data structure can further include a configuration space data structure and a memory space data structure.

The configuration space data structure can be configured to store payloads of configuration write request transaction layer packets and provide data requested by configuration read request transaction layer packets.

The memory space data structure can record information about, for a given persistent memory controller data structure, a location in random access memory of a cache memory that stores data for at least one of the non-volatile storage devices.

An NVMe atomic write unit power fail parameter can be configured to be greater than or equal to a central processing unit page size such that a central processing unit page sized NVM block either is completely overwritten or retains old contents after a power fail or error condition.

The central processing unit can include a memory management unit (MMU) that divides an address space into pages, the cache memory in the random access memory can be divided into pages, and the page size in the cache memory can be the same as the page size used by the memory management unit.

The central processing unit can generates a memory space data structure that includes a list of least-recently-used (LRU) dirty random access memory pages, a list of least-recently-used clean random access memory pages, and a list of free random access memory pages.

The interface switch can include a PCIe switch, the central processing unit and the PCIe switch can be configured to manage cache memory according to a cache memory management process that includes: upon determining no free random access memory page is available but there is at least one clean random access memory page, removing the least recently used clean random access memory page out of the memory space and moving the random access memory page to the list of the free random access memory pages.

The block-addressable non-volatile storage devices can include NVMe solid state drives, and the cache memory management process can include: upon determining that the number of free random access memory pages is less than or equal to a predetermined lower bound, submitting block write requests to the NVMe solid state drive, in which each block write request includes a least recently used dirty random access memory page that is removed from the list of least-recently-used dirty random access memory pages and marked as busy, and the number of block write requests is selected so that the number of busy random access memory pages plus the number of free random access memory pages is greater than or equal to a predetermined upper bound.

The cache memory management process can include: after a block write request is successfully completed, marking the busy random access memory page as clean and adding the random access memory page to the head of the list of least-recently-used clean random access memory pages, unless it is no longer in the memory space, and if the clean random access memory page is no longer in the memory space, adding the random access memory page to the list of free random access memory pages.

The interface switch can include a PCIe switch, the block-addressable non-volatile storage devices can include NVMe solid state drives, and the central processing unit and the PCIe switch can be configured to manage cache memory according to a cache memory management process that includes: receiving a memory request transaction layer packet; generating one or more page-grained sub-requests based on the memory request transaction layer packet; for each sub-request, when there is cache miss, if there is no free or clean random access memory page, waiting until a free random access memory page is available, and if a free random access memory page is available, removing the random access memory page from the list of free random access memory pages, marking the random access memory page as busy, inserting the random access memory page into the memory space, and submitting a block read request with the page to the NVMe solid state drive.

The cache memory management process can include: in the event of a read miss, when the block read request is successfully completed, marking the random access memory page as clean, adding the random access memory page to the tail of the list of least-recently-used clean random access memory pages, and generating a completion transaction layer packet with the requested data from the page as the payload.

The cache memory management process can include: in the event of a write miss, copying the write data to the random access memory page, marking the random access memory page as dirty, and adding the random access memory page to the tail of the list of least-recently-used dirty random access memory pages.

The cache memory management process can include: in the event of a write hit on a busy page, waiting until the busy page is not busy, and in the event of a write hit on a dirty or clean page, copying the write data to the cached random access memory page.

The cache memory management process can include: in the event of a write hit on a clean random access memory page, marking the random access memory page as dirty and moving the random access memory page to the tail of the list of least-recently-used dirty random access memory pages.

The cache memory management process can include: in the event of a read hit, generating a completion transaction layer packet with the requested data from the cached random access memory page as the payload.

In another general aspect, a system for managing software-defined persistent memory includes a management central processing unit (MCPU); one or more first input/output ports configured to receive one or more random access memory (RAM) modules each having random access memory, in which the one or more first input/output ports are electrically coupled to a memory bus that is accessible to the management central processing unit; and one or more second input/output ports configured to receive one or more non-volatile storage devices. The system includes an interface switch comprising one or more upstream ports and one or more downstream ports, in which the interface switch is configured to communicate with one or more host devices through one or more first data links connected to the one or more upstream ports, and communicate with the one or more non-volatile storage devices through one or more second data links connected to the one or more downstream ports, in which the management central processing unit and the interface switch are configured to generate, for each host device, a persistent memory controller data structure that is associated with the corresponding host device, and the persistent memory controller data structure is configured to enable the host device to access the one or more non-volatile storage devices through the one or more first data links using commands designed to access persistent memory. The management central processing unit is configured to initialize the interface switch, and the management central processing unit and the interface switch are configured to use at least a portion of the random access memory as cache memory to temporarily store at least one of read data from the one or more non-volatile storage devices or write data intended to be persistently stored in the one or more non-volatile storage devices.

Implementations can include one or more of the following features. The instructions from the host device comprise instructions designed to access a byte-addressable persistent memory module.

The first and second data links can include one or more of PCIe links, Thunderbolt™ links, NVLinks, CCIX links, OpenCAPI links, or Gen-Z links.

In some examples, the first and second data links include PCIe links, and the interface switch includes a PCIe switch.

The management central processing unit can be configured to, upon receiving an interrupt signal indicating power failure, perform an emergency shutdown process that includes flushing cached data to the one or more non-volatile storage devices.

The emergency shutdown process can include disabling the PCIe link associated with each host device to prevent receiving additional data through the PCIe link from the host device.

The one or more non-volatile storage devices can be associated with one or more write caches implemented using the random access memory, and the emergency shutdown process can include disabling the one or more write caches.

The emergency shutdown process can include flushing write data of memory write transaction layer packets to PCI memory space.

The emergency shutdown process can include flushing data in PCI memory space to at least one corresponding non-volatile storage device.

The emergency shutdown process can include flushing data in a controller memory buffer cache to at least one corresponding non-volatile storage device.

The system can include a power failure detector configured to detect power failure and generate the interrupt signal indicating power failure.

The non-volatile storage devices can include NVM Express® solid state drives.

The management central processing unit can be electrically coupled to the PCIe switch using a PCIe link.

The system can include super capacitors to provide power to at least one of the management central processing unit, random access memory, interface switch, or the non-volatile storage devices during the emergency shutdown process.

Each of at least one of the non-volatile storage devices can include a controller memory buffer (CMB) implemented using dynamic random access memory, a portion of the random access memory can be configured as controller memory buffer cache, and the management central processing unit and the interface switch can be configured to use the cache memory and the controller memory buffer cache to temporarily store the read data and/or write data.

The controller memory buffer can include error-correction code memory, and the non-volatile storage device can be configured to send the management central processing unit an error message transaction layer packet when there is an error in the data associated with the controller memory buffer.

The management central processing unit can generate a controller memory buffer cache data structure in the random access memory, and the controller memory buffer cache data structure can include information about a corresponding controller memory buffer and a location in the controller memory buffer where cache data is stored.

The host devices can include server computers, desktop computers, laptop computers, tablet computers, cameras, or mobile phones.

The PCIe switch can be configured to redirect at least one of configuration, memory, or message request transaction layer packets (TLPs) from each of the upstream ports that is connected to a corresponding host device to the management central processing unit, and the management central processing unit can be configured to process the at least one of the configuration, memory, or message request transaction layer packets.

The management central processing unit can be configured to send at least one of configuration completion, memory read completion, or message request transaction layer packets (TLPs) to the one or more host devices.

The management central processing unit can be configured to send message signaled interrupts to at least one of the one or more host devices to notify the host device of hotplug or hot removal of the corresponding persistent memory controller data structure.

The management central processing unit can be configured to generate, for each persistent memory controller data structure, a configuration space data structure and a memory space data structure in the random access memory.

The configuration space data structure can be configured to store payloads of configuration write request transaction layer packets and provide data requested by configuration read request transaction layer packets.

The memory space data structure can record information about, for a given persistent memory controller data structure, a location in random access memory of a cache memory that stores data for at least one of the non-volatile storage devices.

An NVMe atomic write unit power fail parameter can be configured so that its value is greater than or equal to a management central processing unit page size such that a management central processing unit page sized NVM block either is completely overwritten or retains old contents after a power fail or error condition.

The commands designed to access persistent memory can include commands designed to access byte-addressable memory.

In another general aspect, an apparatus for managing software-defined persistent memory includes a management central processing unit (MCPU); one or more first input/output ports configured to receive one or more random access memory (RAM) modules each having random access memory, in which the one or more first input/output ports are electrically coupled to a memory bus that is accessible to the management central processing unit; and one or more second input/output ports configured to receive one or more non-volatile storage devices, in which the management central processing unit is configured to be electrically coupled to the one or more non-volatile storage devices through PCIe links. The system includes a PCIe switch configured to communicate with one or more host devices through one or more PCIe links, in which the management central processing unit and the PCIe switch are configured to generate, for each host device, a persistent memory controller data structure that is associated with the corresponding host device, and the persistent memory controller data structure is configured to enable the host device to access the one or more non-volatile storage devices through the PCIe links using commands designed to access persistent memory. The management central processing unit is configured to initialize the PCIe switch, and the management central processing unit and the PCIe switch are configured to use at least a portion of the random access memory as cache memory to temporarily store at least one of read data from the one or more non-volatile storage devices or write data intended to be persistently stored in the one or more non-volatile storage devices.

Implementations can include one or more of the following features. The management central processing unit can be configured to, upon receiving an interrupt signal indicating power failure, perform an emergency shutdown process that includes flushing cached data to the one or more non-volatile storage devices.

In another general aspect, an apparatus for managing software-defined persistent memory includes a printed circuit board; a management central processing unit (MCPU) mounted on the printed circuit board; at least one dual in-line memory module (DIMM) socket configured to receive at least one dual in-line memory module comprising random access memory (RAM), in which the at least one dual in-line memory module socket is electrically coupled to a memory bus that is accessible to the management central processing unit; and at least one PCIe socket configured to receive at least one NVMe solid state drive. The apparatus includes a PCIe switch comprising at least one upstream port and at least one downstream port, in which the PCIe switch is configured to communicate with at least one host device through at least one PCIe link electrically coupled to the at least one upstream port, and communicate with the at least one NVMe solid state drive through at least one PCIe link electrically coupled to the at least one downstream port. The management central processing unit and the PCIe switch are configured to generate, for each of the at least one host device, a persistent memory controller data structure that is associated with the corresponding host device, and the persistent memory controller data structure comprises a data structure configured to enable the host device to access the at least one NVMe solid state drive through the at least one PCIe link using commands designed to access non-volatile dual in-line memory modules. The management central processing unit is configured to initialize the PCIe switch, and the management central processing unit and the PCIe switch are configured to use at least a portion of the random access memory as cache memory to temporarily store at least one of read data from the at least one NVMe solid state drive or write data intended to be persistently stored in the at least one NVMe solid state drive.

Implementations can include one or more of the following features. The management central processing unit can include a memory management unit (MMU) that divides an address space into pages, the cache memory in the random access memory can be divided into pages, and the page size in the cache memory can be the same as the page size used by the memory management unit.

The management central processing unit can generate a memory space data structure that includes a list of least-recently-used (LRU) dirty random access memory pages, a list of least-recently-used clean random access memory pages, and a list of free random access memory pages.

The management central processing unit and the PCIe switch can be configured to manage cache memory according to a cache memory management process that includes: upon determining no free random access memory page is available but there is at least one clean random access memory page, removing the least recently used clean random access memory page out of the memory space and moving the random access memory page to the list of the free random access memory pages.

The cache memory management process can include: upon determining that the number of free random access memory pages is less than or equal to a predetermined lower bound, submitting write block requests to the NVMe solid state drive, in which each write block request includes a least recently used dirty random access memory page that is removed from the list of least-recently-used dirty random access memory pages and marked as busy, and the number of write block requests is selected so that the number of busy random access memory pages plus the number of free random access memory pages is greater than or equal to a predetermined upper bound.

The cache memory management process can include: after a block write request is successfully completed, marking the busy random access memory page as clean and adding the random access memory page to the head of the list of least-recently-used clean random access memory pages, unless it is no longer in the memory space, and if the clean random access memory page is no longer in the memory space, adding the random access memory page to the list of free random access memory pages.

The management central processing unit and the PCIe switch can be configured to manage cache memory according to a cache memory management process that includes: receiving a memory request transaction layer packet; generating one or more page-grained sub-requests based on the memory request transaction layer packet; and for each sub-request, when there is cache miss, if there is no free or clean random access memory page, waiting until a free random access memory page is available, and if a free random access memory page is available, removing the random access memory page from the list of free random access memory pages, marking the random access memory page as busy, inserting the random access memory page into the memory space, and submitting a block read request with the page to the NVMe solid state drive.

The cache memory management process can include: in the event of a read miss, when the block read request is successfully completed, marking the random access memory page as clean, adding the random access memory page to the tail of the list of least-recently-used clean random access memory pages, and generating a completion transaction layer packet with the requested data from the page as the payload.

The cache memory management process can include: in the event of a write miss, copying the write data to the random access memory page, marking the random access memory page as dirty, and adding the random access memory page to the tail of the list of least-recently-used dirty random access memory pages.

The cache memory management process can include: in the event of a write hit on a busy page, waiting until the busy page is not busy, and in the event of a write hit on a dirty or clean page, copying the write data to the cached random access memory page.

The cache memory management process can include: in the event of a write hit on a clean random access memory page, marking the random access memory page as dirty and moving the random access memory page to the tail of the list of least-recently-used dirty random access memory pages.

The cache memory management process can include: in the event of a read hit, generating a completion transaction layer packet with the requested data from the cached random access memory page as the payload.

In another general aspect, an apparatus for managing software-defined persistent memory includes: at least one processor; and an interface switch that is configured to be electrically coupled to at least one host device through a first data link, in which the at least one processor and the interface switch are configured to generate a data structure to enable an application program executing on the host device to access at least one block-addressable storage device electrically coupled to the interface switch or the at least one processor through a second data link using a first command configured to access a byte-addressable memory device, and use random access memory as cache memory. The at least one processor is configured to receive the first command from the host device, generate a second command configured to access the at least one block-addressable storage device, and send the second command to the at least one non-volatile block-addressable storage device.

Implementations can include one or more of the following features. The first data link can include a PCIe link, the second data link can include a PCIe link, and the at least one non-volatile block-addressable storage device can include at least one NVMe solid state drive.

The first command can be configured to access a non-volatile dual in-line memory module.

The data structure can include a configuration space data structure that is configured to store payloads of configuration write request transaction layer packets and provide data requested by configuration read request transaction layer packets.

The data structure can include a memory space data structure that records information about an address in the random access memory functioning as cache memory corresponding to an address in the at least one non-volatile block-addressable storage device.

In another general aspect, a method for managing software-defined persistent memory includes: at a central processing unit, generating a data structure that enables a host device to access one or more non-volatile storage devices using commands designed to access persistent memory, in which the data structure includes information about a mapping between cache memory addresses and the addresses in the one or more non-volatile storage devices, and the cache memory addresses correspond to addresses of random access memory; and at the central processing unit, upon receiving a first read command from the host device in which the first read command is designed to retrieve data from a first address of the persistent memory, determining a second address of a cache memory that corresponds to the first address of the persistent memory based on the information about the mapping between the cache memory addresses and the addresses in the one or more non-volatile storage devices, retrieving data from the second address of the cache memory, and sending the retrieved data to the host device.

Implementations can include one or more of the following features. The method can include: at the central processing unit, upon receiving a first write command from the host device in which the first write command is designed to write data to a third address of the persistent memory, determining a fourth address of the cache memory that corresponds to the third address of the persistent memory based on the information about the mapping between the cache memory addresses and the addresses in the one or more non-volatile storage devices, and writing data to the fourth address of the cache memory.

The method can include: at the central processing unit, upon receiving an interrupt signal indicating power failure, performing an emergency shutdown process that includes flushing cached data to the one or more non-volatile storage devices.

The details of one or more of the above aspects and implementations are set forth in the accompanying drawings and the description below. Other features, aspects, and advantages will become apparent from the description, the drawings, and the claims.

BRIEF DESCRIPTION OF DRAWINGS

Like reference symbols in the various drawings indicate like elements.

DETAILED DESCRIPTION

This disclosure describes a novel computing system that implements software-defined persistent memory and enables access to block-addressable storage devices (e.g., NVMe solid state drives) in a manner similar to accessing byte-addressable persistent memory (e.g., non-volatile dual in-line memory modules). An application program executing on a host may interact with a memory controller using commands designed for byte-addressable memory, and interact with an NVMe solid state drive using commands designed for block-addressable storage devices. A novel feature of the invention is to provide a PCIe switch and a management central processing unit that generate a persistent memory controller data structure that is used for emulating the functions of a persistent memory controller. This enables the host to access an NVMe solid state drive connected to the PCIe switch through a PCIe bus in a manner similar to accessing a non-volatile dual in-line memory module that is connected to a memory bus.

The system includes random access memory, a portion of the random access memory is configured as cache memory, and the NVMe solid state drive is used to persistently store data. This allows the application program to access persistent data storage at speeds faster than using the NVMe solid state drive alone, at a cost per storage unit that is lower than using the dynamic random access memory alone. The amount of persistent memory available to the system can be increased by connecting more NVMe solid state drives to the PCIe switch through PCIe buses, which is more cost effective than connecting more non-volatile dual in-line memory modules to the memory bus.

In the following, examples systems are described using PCIe links for connection with hosts and non-volatile mass storage devices. However, the invention can also be applied to systems that use other types of data links, such as a Thunderbolt™ link, an NVIDIA® NVLink™, a cache coherent interconnect for accelerators (CCIX) link, an OpenCAPI (coherent accelerator processor interface) link, or a Gen-Z link.

Figure 1:
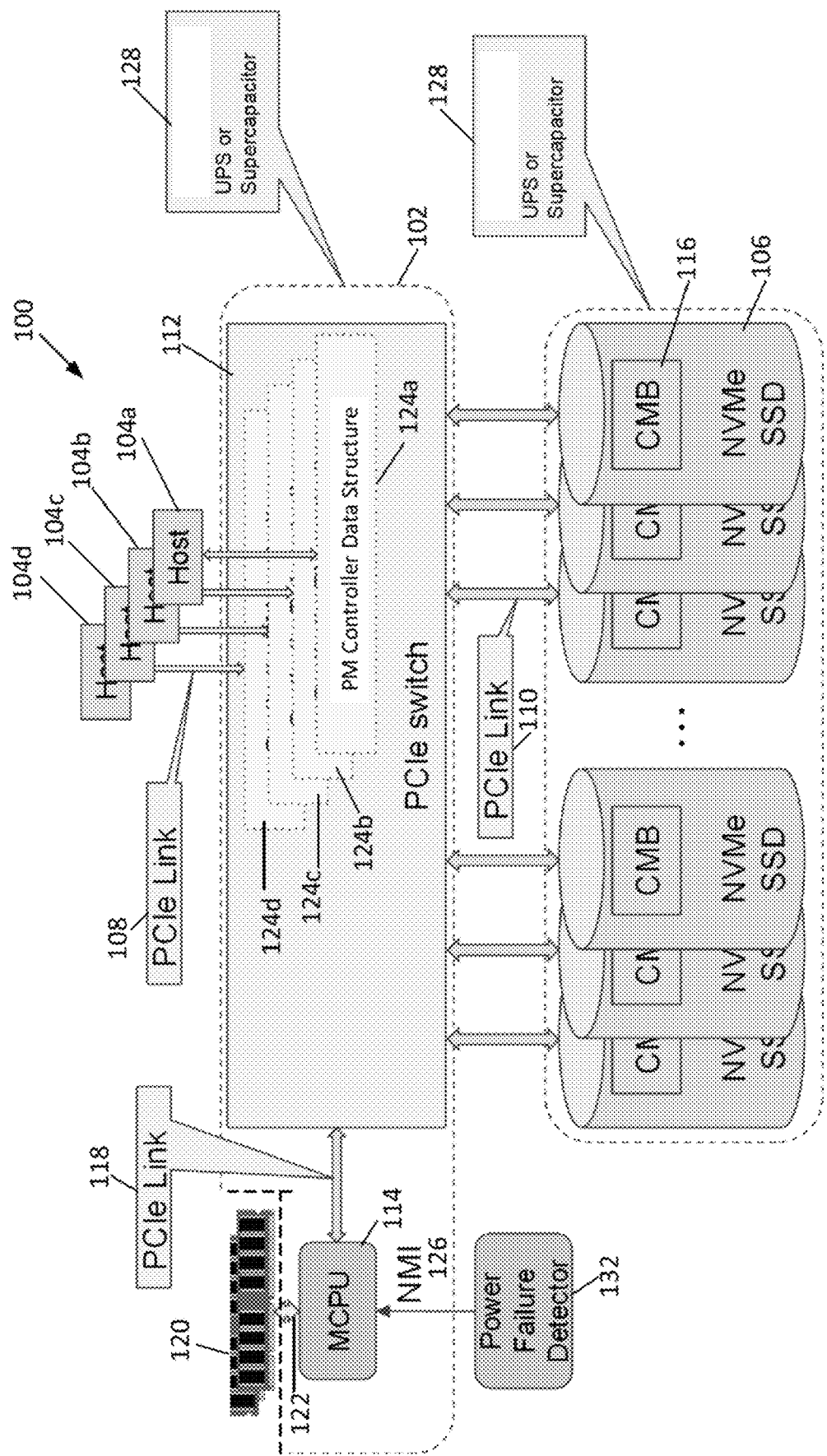
FIG. 1 is a diagram of an example computing system having persistent memory.

Referring to FIG. 1, a system 100 includes a persistent memory management module 102 that connects to one or more upstream hosts, e.g., 104a, 104b, 104c, and 104d, collectively referenced as 104, through one or more first data links 108, and connects to one or more downstream persistent mass storage devices, such as NVMe solid state drives 106, through one or more second data links 110. In this example, each of the first data links 108 and the second data links 110 is a PCIe link, but can also be another type of data link, such as a Thunderbolt™ link, an NVIDIA® NVLink™, a CCIX link, an OpenCAPI link, or a Gen-Z link.

The module 102 includes a PCIe switch 112 and a management CPU (MCPU) 114. The PCIe switch 112 includes upstream ports for connecting to the upstream PCIe links 108, and downstream ports for connecting to the downstream PCIe links 110. The PCIe switch 112 receives commands or instructions from the hosts 104, and processes the commands (or instructions) or redirects the commands (or instructions) to the management central processing unit 114. The PCIe switch 112 sends write data to, or receives read data from, the NVMe solid state drives 106 in accordance with the commands (or instructions) from the management central processing unit 114, which in turn receives commands (or instructions) from the hosts 104.

The management central processing unit 114 can be, e.g., a commodity central processing unit or a system-on-a-chip. The management central processing unit 114 executes software to initialize the PCIe switch 112 and activate various functions of the PCIe switch 112. In this example, the management central processing unit 114 is connected to the PCIe switch 112 through a PCIe link 118. The system 100 includes random access memory 120 that is accessible to the management central processing unit 114 through a memory bus 122. The random access memory 120 can be, e.g., dynamic random access memory, and the memory bus 122 can be, e.g., a DDR, DDR2, DDR3, or DDR4 memory bus. The random access memory 120 can optionally have error correction code (ECC) protection.

The management central processing unit 114 and the PCIe switch 112 are configured to generate various data structures in the random access memory 120 that are useful to implement the functions of the persistent memory management module 102. The data structures include, e.g., persistent memory (PM) controller data structures, e.g., 124a, 124b, 124c, and 124d, collectively referenced as 124, in which each persistent memory controller data structure 124 is associated with a corresponding host 104. For example, the persistent memory controller data structure 124a is associated with the host 104a, and the persistent memory controller data structure 124b is associated with the host 104b, etc. The persistent memory controller data structure 124 stores data that are configured to enable the corresponding host 104 to see a persistent memory controller as an endpoint of the PCIe link 108. The management central processing unit 114 also generates data structures that are useful for configuring a portion of the random access memory 120 as cache memory.

The management central processing unit 114 is configured to, by itself or through the use of the PCIe switch 112, send transaction layer packets (TLPs, e.g., MSI or MSI-X) to a host 104. This allows a host 104 to be notified of hotplug or surprise removal of a persistent memory controller data structure 124.

Each of the hosts 104 can include, e.g., a server computer, a desktop computer, a laptop computer, a tablet computer, a camera, or a mobile phone. In some implementations, each host can have its own central processing unit, random access memory, non-volatile storage device, operating system, and application programs. The random access memory 120 is accessible to the management central processing unit 114, and the random access memory 120 is independent of the random access memory of the hosts 104.

In some implementations, the NVMe solid state drive 106 includes non-volatile memory (e.g., NAND-based flash memory) and dynamic random access memory. The non-volatile memory allows data to be persistently stored when there is no power. In some implementations, a portion of the dynamic random access memory can be used to implement a controller memory buffer (CMB) 116. In this example, a portion of the random access memory 120 is configured as controller memory buffer cache. The management central processing unit 114 and the PCIe switch 112 are configured to use the cache memory (implemented using dynamic random access memory 120) and optionally, the controller memory buffer cache, to temporarily store the read and/or write data. In this document, when we say that data are persistently stored in the NVMe solid state drive, we mean that the data are persistently stored in the non-volatile memory of the NVMe solid state drive.

The controller memory buffer 116 is error correction code-protected. If an error correction code error occurs in the controller memory buffer 116, the NVMe solid state drive 106 sends the management central processing unit 114 a non-fatal error message transaction layer packet, and reports uncorrectable internal error status by the uncorrectable error status register of advanced error reporting (AER). The identify controller data structure includes an NVMe atomic write unit power fail (AWUPF) field that indicates the size of the write operation guaranteed to be written atomically to the non-volatile memory across all namespaces with any supported namespace format during a power fail or error condition. In this example, the atomic write unit power fail field is configured to have a value that is greater than or equal to the management central processing unit page size. As a result, after a power fail or error condition, an MCPU-page-sized non-volatile memory block either is completely overwritten or retains old contents.

One of the functions of the software persistent memory controller data structure 124 is to allow the management central processing unit 114 and/or the PCIe switch 112 to emulate a hardware persistent memory controller that controls access to byte-addressable persistent memory. From the perspective of the host 104, the host 104 interacts with the management central processing unit 114 and/or the PCIe switch 112 (which utilizes the data stored in the persistent memory controller data structure 124) in a manner similar to interacting with a hardware persistent memory controller.

The PCIe switch 112 is configured to redirect configuration, memory, and message request transaction layer packets (TLPs) from an upstream port to the management central processing unit for further processing. The PCIe switch 112 is configured to support disabling the link of an individual upstream port. This is useful to prevent receiving more data from the upstream port in case of power failure as described below.

The system 100 includes a power failure detector 132 to detect power failure. Upon detection of power failure, the power failure detector 132 sends a non-maskable interrupt 126 to the management central processing unit 114, which executes an emergency shutdown process that includes, e.g., disabling the upstream PCIe link 108 associated with each host device 104 to prevent receiving additional data through the upstream PCIe link 108 from the host device 104. The emergency shutdown process includes flushing cached data to the NVMe solid state drives 106. The system 100 includes an uninterruptible power supply (UPS) or a supercapacitor 128 for providing backup power to the PCIe switch 112, the management central processing unit 114, the random access memory 120, and the NVMe solid state drives 106 during the emergency shutdown process.

In some implementations, the management central processing unit 114 or the random access memory 120 can be integrated with the PCIe switch 112. The interconnection between the management central processing unit 114 and the PCIe switch 112 can be a link different from a PCIe link. In some implementations, the NVMe solid state drives 106 are connected directly to the management central processing unit 114 (e.g., through PCIe links) rather than to the PCIe switch 112.

In some implementations, a motherboard is provided in which the PCIe switch 112, the management central processing unit 114, the supercapacitor 128, and the power failure detector 132 are mounted on the motherboard. The motherboard includes input/output interfaces, such as dual in-line memory module sockets, for receiving the random access memory 120. The motherboard can include input/output interfaces, such as PCIe slots, for receiving the NVMe solid state drives 106.

The following briefly describes the difference between a command or instruction designed to access a byte-addressable persistent memory module (e.g., a non-volatile dual in-line memory module) and a command or instruction designed to access a block-addressable storage device (e.g., an NVMe solid state drive). A "block" is typically 512 bytes or more. Using an x86 central processing unit as an example, when the central processing unit needs to read, e.g., one byte or four bytes (32-bit) of data from persistent memory located at the address X, the central processing unit may issue a command that is similar to "mov al, X" or "mov eax, X," in which al and eax are the central processing unit registers. Both of the commands "mov al, X" and "mov eax, X" are examples of commands designed to access persistent memory, and are also examples of byte-addressable commands.

For example, when the central processing unit needs to read one block (e.g., 512 bytes) of data from a solid state drive, the central processing unit may set up a 64-byte command block in a submission queue located in random access memory, which indicates a read operation and the buffer receiving the block data, and then write the location of that command block to the solid state drive's submission queue doorbell register, which is also located in the PCI memory space. In response to such a memory write, the solid state drive reads that command block from the random access memory, recognizes the command as a read operation, transfers the requested 512-byte data to the buffer indicated in that command block, sets up a 16-byte data in the completion queue located in the random access memory, which indicates the completion of one command or a series of commands, and then sends an interrupt to the central processing unit. In response to that interrupt, the central processing unit processes the data in the completion queue, and then writes the location of the last processed completion data to the solid state drive's completion queue doorbell register, which is also located in the PCI memory space.

Figure 6:
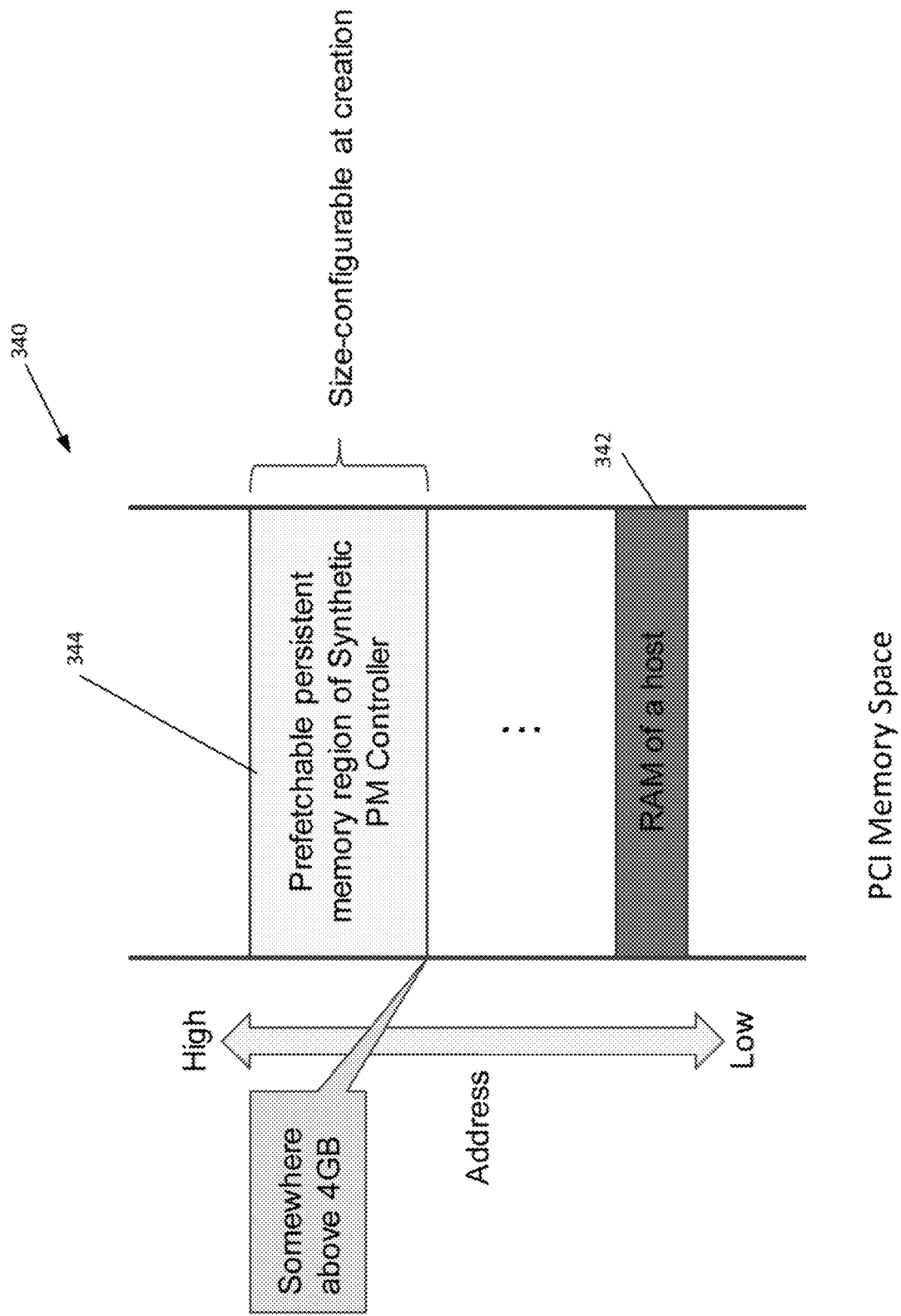
FIG. 6 is a diagram that shows example persistent memory as seen by a host.

In the example above, the host operating system or application program 200 can execute the command "mov eax, X" to cause data to be read from the address X of the persistent memory implemented using the NVMe solid state drive 106 if the address X is in the persistent memory region associated with the host as shown in FIG. 6. In some implementations, when the "mov" instruction is executed by the x86 central processing unit, the "mov' instruction is converted into one or more memory read or write request transaction layer packets, depending on how the two operands of the "mov" instruction are specified. For example, "mov eax, X" is converted into one or two memory read request transaction layer packets, whereas "mov X, eax" is converted into one or two memory write request transaction layer packets. If X is a multiple of 4, only one memory request transaction layer packet is generated. Additional examples of commands or instructions that are designed to access persistent memory include variants of the "mov" instructions, such as the "movd" instruction that is designed to move four-byte data, and the "movq" instruction that is designed to move eight-byte data, from either persistent or volatile memory to an MMX or SSE2 register, or vice versa. These commands or instructions designed to access persistent memory are also byte-addressable commands or instructions.

In this document, depending on context, a command or instruction for a certain action can be converted to several sub-commands or sub-instructions that together are configured to achieve the action. Thus, executing a command or instruction designed to access a non-volatile dual in-line memory module can result in generating several sub-commands or sub-instructions, such as several transaction layer packets, that together are configured to enable the host to access the non-volatile dual in-line memory module.

In the above example, the central processing unit cannot execute a "mov eax, X" instruction to directly cause block data to be read from an NVMe solid state drive connected to the PCIe bus. Different mass storage devices have different programming interfaces, such as NVMe, SCSI, SATA, etc. When the central processing unit identifies a block-addressable mass storage device connected to a bus, the central processing unit will access the block data using the programming interfaces associated with the mass storage device. Thus, the central processing unit will access block data of an NVMe solid state drive using the NVMe programming interface, and access the block data of an SCSI hard drive using the SCSI programming interface, etc.

PCI devices are categorized into several classes. The host 104 can read the class code, subclass, and prog-if registers located in the type 0 configuration space header to differentiate one class of device from another. For example, the class code 01h corresponds to mass storage controllers, within that class the subclass 08h corresponds to non-volatile memory controllers, and within that subclass the prog-if 02h corresponds to the NVM Express protocol. The overall PCI class code 010802h corresponds to a mass non-volatile memory controller complying with the NVMe protocol. Thus, when the host 104 identifies a device as being associated with the class code 010802h, the host 104 determines that the device is an NVMe solid state drive or equivalent. A list of various PCI class codes can be found at https://wiki.osdev.org/PCI#Class_Codes.

The PCI class code 05h corresponds to memory controllers, within that class the sub class 80 corresponds to "Other." In some implementations, the PCIe switch 112 and the management central processing unit 114 are configured to, upon connecting with a host 104, generate a persistent memory controller data structure 124 that is associated with the host 104, and report to the host 104 that the device being accessed by the host 104 is a memory controller that has a class code 058000h. The management central processing unit 114 and the PCIe switch 112 operates in a manner similar to a virtual persistent memory controller that is associated with the host 104 in which the data related to the virtual persistent memory controller are stored in the persistent memory controller data structure 124 associated with the host 104. A software persistent memory driver 258 (FIG. 4) that executes on the host 104 recognizes the class code 058000h and identifies the device being accessed as a persistent memory controller. If the host 104 determines that a device connected to the PCIe link is an NVMe solid state drive, the host 104 will send to the device commands or instructions designed for accessing a block-addressable storage device. If the host 104 determines that a device connected to a PCIe link is a persistent memory controller, the host will send to the device commands or instructions designed for accessing a byte-addressable persistent memory module.

The persistent memory controller data structure 124a stores data that enable the PCIe switch 112 and the management central processing unit 114 to operate as a virtual persistent memory controller in response to requests for accessing persistent memory from the host 104a. The persistent memory controller data structure 124b stores data that enable the PCIe switch 112 and the management central processing unit 114 to operate as a virtual persistent memory controller in response to requests for accessing persistent memory from the host 104b, and so forth.

As will be described in more detail below, the persistent memory controller data structure 124a stores configuration space data that enable the PCIe switch 112 and the management central processing unit 114 to configure the virtual persistent memory controller associated with the host 104a. The persistent memory controller data structure 124a also stores memory space data that enable the PCIe switch 112 and the management central processing unit 114 to use a portion of the RAM 120 as cache memory for read and write operations associated with the host 104a. The persistent memory controller data structure 124b stores configuration space data that enable the PCIe switch 112 and the management central processing unit 114 to configure the virtual persistent memory controller associated with the host 104b. The persistent memory controller data structure 124b also stores memory space data that enable the PCIe switch 112 and the management central processing unit 114 to use a portion of the RAM 120 as cache memory for read and write operations associated with the host 104b, and so forth.

When the PCIe switch 112 and the management central processing unit 114 receive instructions from the host 104a for accessing a first persistent memory region associated with the host 104a, the PCIe switch 112 and the management central processing unit 114 access the persistent memory controller data structure 124a to determine the configuration of the virtual persistent memory controller associated with the host 104a, determine which NVMe solid state drive 106 is mapped to the first persistent memory region, and determine where data is cached in the random access memory 120. Based on the information obtained from the persistent memory controller data structure 124a, the PCIe switch 112 and the management central processing unit 114 operate as the virtual persistent memory controller to respond to the instructions from the host 104a, including one or more of the following operations:

(i) Retrieve read data from the cache memory in the random access memory 120 in case of a read hit;

(ii) Retrieve read data from the NVMe solid state drive 106 mapped to the first persistent memory region in case of a read miss, and store the read data in the cache memory in the random access memory 120;

(iii) Store write data to the cache memory in the random access memory 120 in case of a write hit;

(iv) Store write data in the NVMe solid state drive 106 mapped to the first persistent memory region in case of a write miss, and store the write data in the cache memory in the random access memory 120; and (v) Flush the write data from the cache memory in the random access memory 120 to the NVMe solid state drive 106 mapped to the first persistent memory region from time to time, especially in case of power failure.

Similarly, when the PCIe switch 112 and the management central processing unit 114 receive instructions from the host 104b for accessing a second persistent memory region associated with the host 104b, the PCIe switch 112 and the management central processing unit 114 access the persistent memory controller data structure 124b to determine the configuration of the virtual persistent memory controller associated with the host 104b, determine which NVMe solid state drive 106 is mapped to the second persistent memory region, and determine where data is cached in the random access memory 120. Based on the information obtained from the persistent memory controller data structure 124b, the PCIe switch 112 and the management central processing unit 114 operate as the virtual persistent memory controller to respond to the instructions from the host 104b, including one or more of the following operations:

(i) Retrieve read data from the cache memory in the random access memory 120 in case of a read hit;

(ii) Retrieve read data from the NVMe solid state drive 106 mapped to the second persistent memory region in case of a read miss, and store the read data in the cache memory in the random access memory 120;

(iii) Store write data to the cache memory in the random access memory 120 in case of a write hit;

(iv) Store write data in the NVMe solid state drive 106 mapped to the second persistent memory region in case of a write miss, and store the write data in the cache memory in the random access memory 120; and (v) Flush the write data from the cache memory in the random access memory 120 to the NVMe solid state drive 106 mapped to the second persistent memory region from time to time, especially in case of power failure.

In some implementations, the persistent memory driver 258 is a piece of software code executed by the host 104, e.g., during boot up. The persistent memory driver 258 examines the PCI class codes of the devices connected to the PCIe interface to determine if there is any device that reports the class code of 058000h. If the persistent memory driver 258 finds a device, e.g., the persistent memory controller data structure 124, having a class code 058000h, the software persistent memory driver determines that the persistent memory controller data structure 124 corresponds to a software persistent memory controller, and notifies the host operating system that the persistent memory controller data structure 124 can be controlled by the software persistent memory driver. The operating system or the application program of the host 104 uses the software persistent memory driver to interact with the persistent memory controller data structure 124 in order to access a particular PCI memory address space allocated to or associated with the persistent memory controller data structure 124. More details related to the software persistent memory driver is described below, see FIG. 4 and related description.

Figure 2:
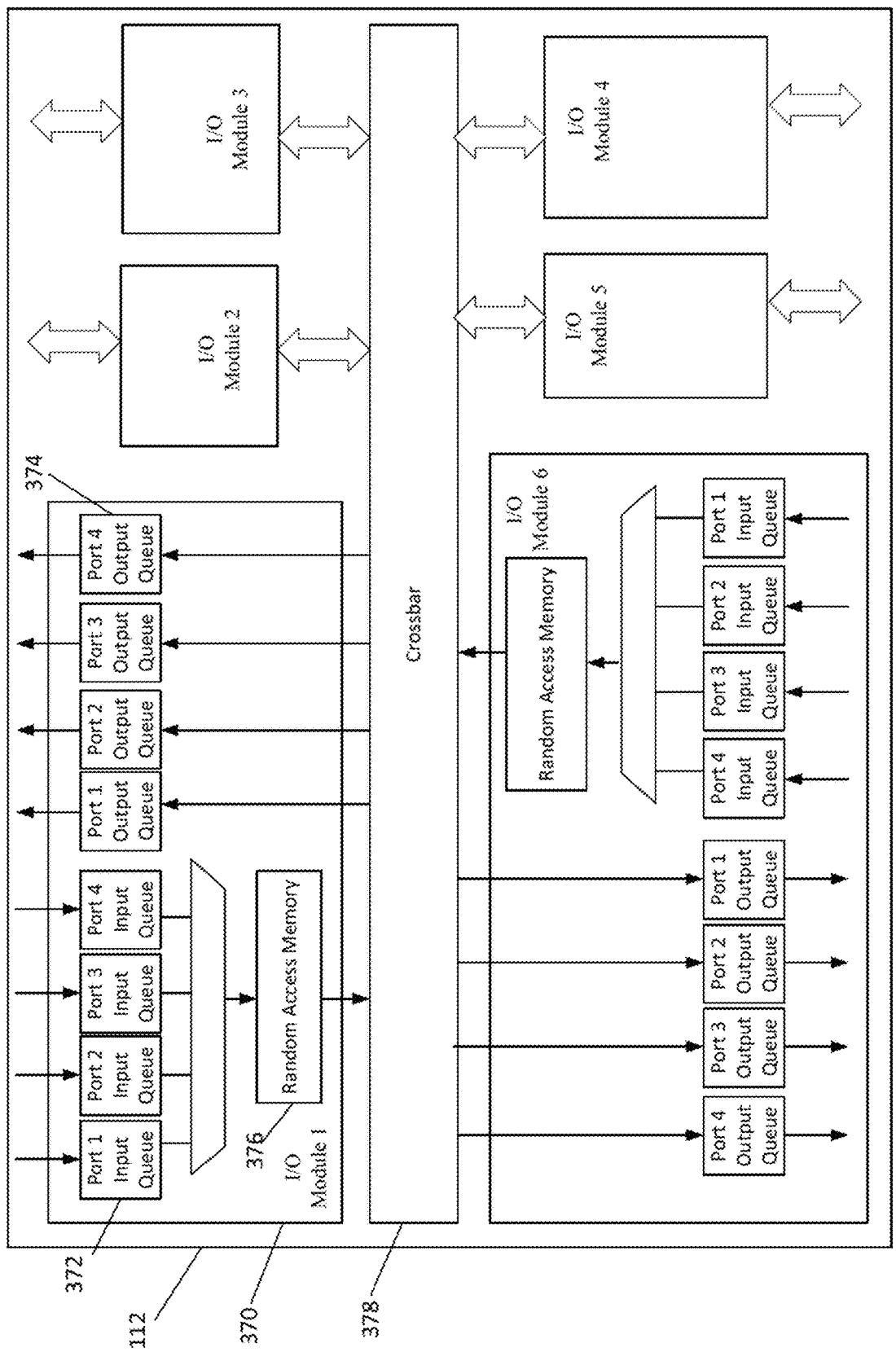
FIG. 2 is a diagram of an example PCIe switch.

FIG. 2 is a block diagram of an example PCIe switch 112 that includes multiple input/output (I/O) modules 370. In this example, the PCIe switch 112 includes six input/output modules 370, but the PCIe switch 112 can also have a different number of input/output modules. Each input/output module 370 may be configured as a plurality of upstream ports for connecting to the upstream PCIe links, and/or downstream ports for connecting to the downstream PCIe links. In this example, each input/output module 370 includes four x4 ports: Port 1, Port 2, Port 3, and Port 4. Each port can be configured as an upstream port or a downstream port. The ports can be combined so that the input/output module 370 can also be configured to have two x8 ports or one x16 port, either upstream or downstream. Each port includes an input queue 372 and an output queue 374. The ports within an input/output module 370 share a random access memory 376 that stores the received packet data. The input/output modules 370 are interconnected through a crossbar module 378. Any transaction layer packet (TLP) received from an input queue 372 of an input/output module 370 can be transmitted to an output queue 374 of the same input/output module 370 or another input/output module 370 through the crossbar module 378. In FIG. 1, the management central processing unit 114 connects to the PCIe switch 112 through a PCIe link 118, and the PCIe link 118 is connected to one of the ports of one of the input/output modules 370. The port connected to the management central processing unit 114 is referred to as the management port.

When the host 104 sends a configuration, memory, or message request transaction layer packet through an upstream port to the PCIe switch 112, the PCIe switch 112 sends an interrupt to the management central processing unit 114. An address trap is set up by the management central processing unit 114 in advance for the PCIe switch 112 to redirect memory request transaction layer packets from a host 104 to the management central processing unit 114. The crossbar module 382 routes the received transaction layer packets by the rules defined by the PCIe specification, except for the transaction layer packet that are to be redirected to the management central processing unit 114. The PCIe specification defines how to route various types of transaction layer packets such as configuration request/completion transaction layer packet, memory request/completion transaction layer packet, and message request transaction layer packet.

For example, suppose a host 104 wants to write data to address ADDR_1 in the persistent memory, and address ADDR_1 maps to the second NVMe solid state drive 106 connected to Port 1 of the input/output module 2. The host 104 does not see the NVMe solid state drive 106 and does not know that the address ADDR_1 maps to an NVMe solid state drive. Rather, the host 104 identifies the address ADDR_1 as belonging to a persistent memory region that is associated with a persistent memory controller data structure 124 having the PCI class code 058000h, in which interactions with the persistent memory controller data structure 124 is controlled by the software persistent memory driver. The host 104 accesses the address ADDR_1 in the same manner as accessing persistent memory, such as persistent memory implemented using non-volatile dual in-line memory module.

In the above example, to write data to the address ADDR_1 in the persistent memory, the data is first written to the cache memory in the random access memory 120, then from the cache memory to the NVMe solid state drive 106. In this process, the management central processing unit 114 sets up an address trap that matches the prefetchable persistent memory region. Afterwards, if a memory request transaction layer packet has an address ADDR_1 located in that region, the crossbar module 382 routes that transaction layer packet to the management port that is connected to the management central processing unit 114, which is then responsible for accessing a certain block of the second NVMe solid state drive that is associated with the address ADDR_1 by a certain mapping. The configuration request and message request transaction layer packets and the memory request transaction layer packets that hit the address traps are forwarded to the management central processing unit 114.

Figure 3:
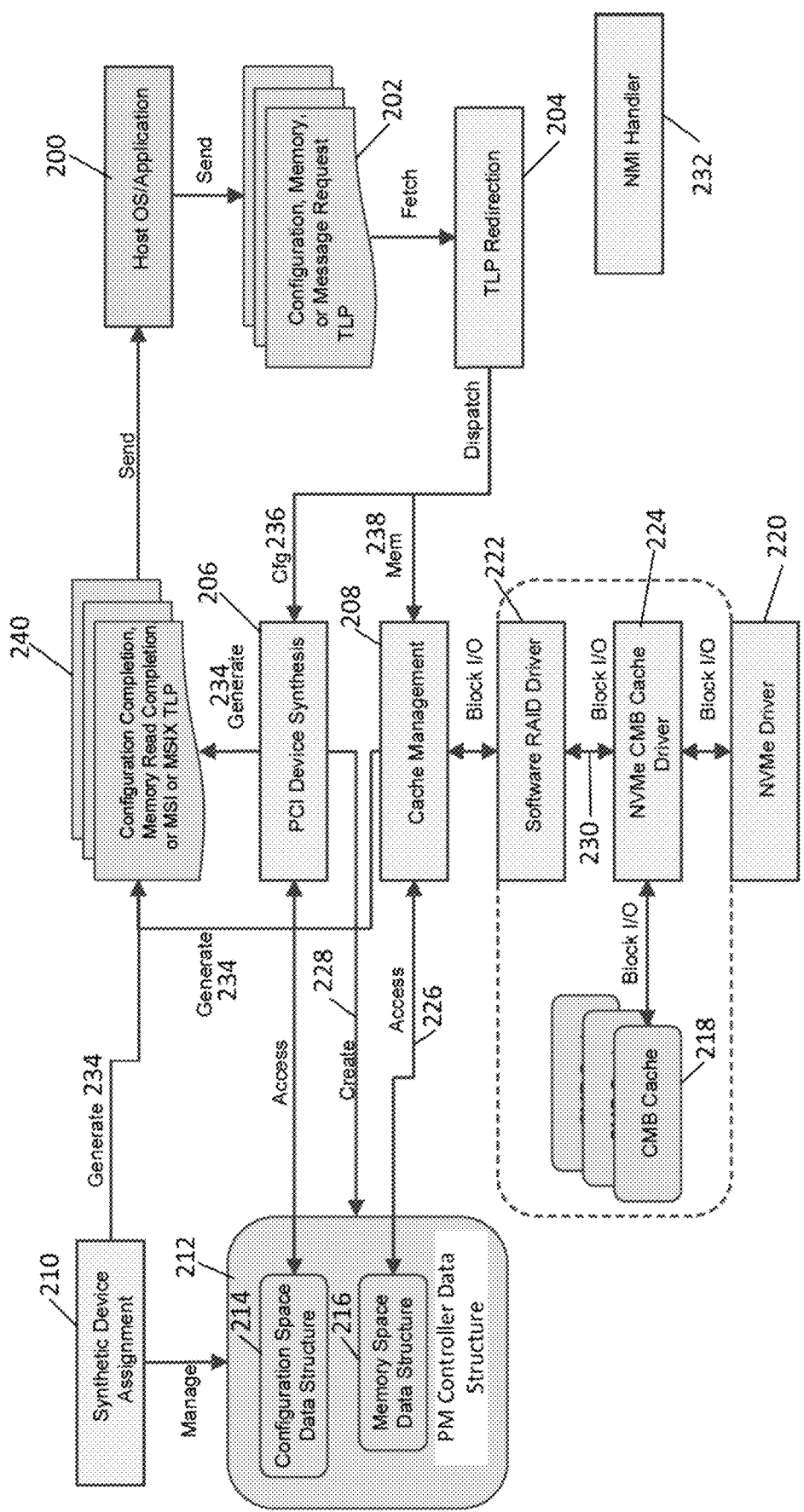
FIG. 3 is a block diagram of example software modules and data structures used in the system.

FIG. 3 is a block diagram of software modules and data structures used in the system 100. The software modules are executed by the management central processing unit 114. A host operating system or application program 200 executing on a host 104 causes the central processing unit of the host 104 to send configuration, memory, and/or message request transaction layer packets 202 to the PCIe switch 112, in which the configuration, memory, or message request transaction layer packets are stored either in the random access memory 120 or in the PCIe switch 112. For example, the management central processing unit 114 sets up a buffer in the random access memory 120 in advance, and configures the PCIe switch 112 to use that buffer to store the transaction layer packets that need to be redirected to the management central processing unit 114.

A transaction layer packet redirection module 204 fetches the various request transaction layer packets and handles the message request transaction layer packets by itself, e.g., in some cases the message request transaction layer packets are ignored. The transaction layer packet redirection module 204 is a software module executed by the management central processing unit 114. When the PCIe switch 112 receives a transaction layer packet from any host 104, the PCIe switch 112 notifies the management central processing unit 114 that a new transaction layer packet has arrived, and the transaction layer packet redirection module 204 examines the transaction layer packet to determine where it should be directed to. The transaction layer packet redirection module 204 redirects the configuration transaction layer packets 236 to a PCI device synthesis module 206, and redirects the memory transaction layer packets 238 to a cache management module 208.

The PCI device synthesis module 206 generates 228 a persistent memory controller data structure 212 stored in the random access memory 120 for each host 104. The persistent memory controller data structure 212 is a data structure that stores information useful for the operation of the software defined persistent memory. The PCI device synthesis module 206 also generates a configuration space data structure 214 and a memory space data structure 216 that are stored in the random access memory 120. As described below, the configuration space data structure and the memory space data structure can be part of the persistent memory control module data structure.

The persistent memory controller data structure 212 contains information that enables the management central processing unit 114 and/or the PCIe switch 112 to emulate a persistent memory controller and interact with the corresponding host 104 in a manner similar to how a physical persistent memory controller would interact with the host 104. The management central processing unit 114 and the PCIe switch 112 operate as a software persistent memory controller or a virtual persistent memory controller based on information contained in the persistent memory controller data structure 212. The host 104 interacts with the software or virtual persistent memory controller implemented by the management central processing unit 114 and/or the PCIe switch 112 in the same manner as interacting with a persistent memory controller that controls byte-addressable persistent memory, such as non-volatile dual in-line memory modules, even though the data is persistently stored in one or more block-addressable non-volatile storage devices, such as the NVMe solid state drives 106. The system 100 enables the host 104 to operate as if it is accessing byte-addressable persistent memory, even though the data is actually persistently stored in one or more block-addressable solid state drives. Thus, the persistent memory implemented by the system 100 is referred to as software-defined persistent memory.

In order for the management central processing unit 114 and/or the PCIe switch 112 to operate as a virtual persistent memory controller, the persistent memory controller data structure 212 stores information that are typically available to a physical persistent memory controller. Such information is stored in, e.g., the configuration space data structure 214 and the memory space data structure 216.

An example of the persistent memory control module data structure is as follows:

```
struct pm_control {
    struct pm_config_space *config;
    struct pm_memory_space *mem;
    unsigned int host_port;
    ...
};
```

In the above example, "config" is the pointer to the configuration space data structure, "mem" is the pointer to memory space data structure, and "host_port" indicates the upstream port this data structure is associated with.

An example of the configuration space data structure is as follows:

```
struct pm_config_space {
    struct type0_header header;
    struct pcie_capability pcie_cap;
    struct pci_power_mgmt power_mgmt;
    struct pcie_aer_ext_cap aer_cap;
    ...
};
```

In the above example, "header," "pcie_cap," "power_mgmt," and "aer_cap" are formatted according to the PCIe type 0 configuration space header, the PCIe capability structure, the PCI power management capability structure, and the PCIe advanced error reporting extended capability structure as defined in the PCI Express® Base Specification Revision 4.0, published by PCI-SIG (https://pcisig.com).

For example, the PCIe type 0 configuration space header can include one or more of the following: Device ID, Vendor ID, Status, Command, Class Code, Revision ID, BIST, Header Type, Master Latency Timer, Cache Line Size, Base Address Registers, Cardbus CIS Pointer, Subsystem ID, Subsystem Vendor ID, Expansion ROM Base Address, Capabilities Pointer, Max_Lat, Min_Gnt, Interrupt Pin, and Interrupt Line. For example, the PCIe capability structure can include one or more of the following: PCI Express Capabilities Register, Next Cap Pointer, PCI Express Cap ID, Device Capabilities, Device Status, Device Control, Link Capabilities, Link Status, Link Control, Slot Capabilities, Slot Status, Slot Control, Root Capabilities, Root Control, and Root Status. For example, the PCI power management capability structure can include one or more of the following: Power Management Capabilities (PMC), Next Capability ID, Capability ID, and Power Management Control/Status Register (PMCSR). For example, the PCIe advanced error reporting extended capability structure can include one or more of the following: PCI Express Extended Capability Header, Uncorrectable Error Status Register, Uncorrectable Error Mask Register, Uncorrectable Error Severity Register, Correctable Error Status Register, Correctable Error Mask Register, Advanced Error Capabilities and Control Register, Header Log Register, Root Error Command, Root Error Status, Error Source Identification Register, Correctable Error Source Identification Register, and TLP Prefix Log Register. The information stored in the configuration space header, the PCIe capability structure, the PCI power management capability structure, and the PCIe advanced error reporting extended capability structure can be used in accordance with the PCIe Base Specification.

An example of the memory space data structure is as follows:

```
struct pm_memory_space {
    dev_t bdev_num;
    struct block_device *bdev;
    struct radix_tree_root cache;
    ...
};
```

In this example, "bdev_num" is the device number of the underlying block device, it is used to obtain the pointer to the block_device structure; "bdev" is the pointer returned from a call to blkdev_open_by_dev (a Linux kernel application programming interface (API)) by passing bdev_num, and "cache" is a radix tree, used as cache memory.

The configuration space data structure 214 stores the payload of a configuration write request transaction layer packet and supplies data requested by a configuration read request transaction layer packet. The memory space data structure 216 records which block device it is mapped to, where data is cached in the random access memory 120, and any other information useful to the cache management module 208. The PCI device synthesis module 206 has access to the configuration space data structure 214 to generate configuration completion transaction layer packets in response to configuration request transaction layer packets.

A synthetic device assignment module 210 determines which persistent memory controller data structure 212 is associated with or attached to which host 104, and generates 234 an MSI or MSI-X transaction layer packet 240 to notify a host of hotplug or surprise removal of a persistent memory controller data structure 212. The PCI device synthesis module 206, the cache management module 208, and the synthetic device assignment module 210 generate 234 configuration completion, memory read completion, or MSI or MSI-X transaction layer packets 240 that are stored either inside the PCIe switch 112 or in the random access memory 120. The PCIe switch 112 in turn sends each transaction layer packet to the target host specified by the "requester ID" field of the transaction layer packet.

An NVMe driver 220 interacts with the NVMe solid state drives 106 to cause the NVMe solid state drives 106 to transfer data to or from the cache memory (in the random access memory 120) that is associated with the NVMe solid state drives 106. Optionally, a software redundant array of independent disks (RAID) driver 222 is provided to enable software RAID. An NVMe controller memory buffer cache driver 224 is provided to enable controller memory buffer cache function. A controller memory buffer cache data structure 218 is stored in the random access memory 120 and records which controller memory buffer 116 it is associated with, where data is cached in that controller memory buffer 116, and any other information useful for the NVMe controller memory buffer cache driver 224.

In response to a memory request transaction layer packet, the cache management module 208 accesses 226 the memory space data structure 216 of the persistent memory controller data structure 212, retrieves data from a corresponding region in random access memory (which functions as cache memory) based on information in the memory space data structure 216, and generates a memory read completion transaction layer packet. In the event of cache miss or cache writeback, the cache management module 208 sends block input/output requests to a lower layer, such as the software RAID driver 222 or the NVMe controller memory buffer cache driver 224.

The software RAID driver 222 is used when the actual persistent storage is provided by two or more NVMe solid state drives 106. The software RAID driver 222 sends the NVMe controller memory buffer cache driver 224 block input/output requests 230 in accordance with the RAID level.

The NVMe controller memory buffer cache driver 224 and the controller memory buffer cache 218 are used when the NVMe solid state drive 106 supports controller memory buffer. In that case, the NVMe controller memory buffer cache driver 224 uses the controller memory buffer 116 as a cache to fulfill requests from the upper layer, such as the cache management module 208 or the software RAID driver 222.

A non-maskable interrupt (NMI) handler 232 is invoked by the management central processing unit 114 upon system power failure, upon which the non-maskable interrupt handler 232 performs emergency shutdown.

The following describes a process for initializing the PCIe switch 112 and operating the various software modules shown in FIG. 3.

Step 1: The PCI device synthesis module 206 generates a persistent memory controller data structure 212 and associated configuration space data structure 214 and memory space data structure 216.

Step 2: The synthetic device assignment module 210 associates the persistent memory controller data structure 212 with a host 104, and generates 234 an MSI or MSI-X transaction layer packet 240 that is sent to the host 104 for hotplug notification.

Step 3: In response to the hotplug notification, the host operating system or application 200 sends a series of configuration request transaction layer packets 202 to the persistent memory controller data structure 212.

Step 4: The PCIe switch 112 redirects the configuration request transaction layer packets 202 to the management central processing unit 114.

Step 5: At the management central processing unit 114, the transaction layer packet redirection module 204 dispatches the configuration request transaction layer packets 202 to the PCI device synthesis module 206.

Step 6: When the host operating system or application 200 accesses the persistent memory region associated with the persistent memory controller data structure 212, the host operating system or application 200 sends a series of memory request transaction layer packets 202 (intended for the persistent memory controller data structure 212) to the PCIe switch 112. The memory request transaction layer packets 202 can include, e.g., memory read request transaction layer packets and memory write request transaction layer packets.

Step 7: The PCIe switch 112 redirects the memory request transaction layer packets 202 to the management central processing unit 114.

Step 8: At the management central processing unit 114, the transaction layer packet redirection module 204 sends the memory request transaction layer packets 238 to the cache management module 208.

Step 9: For each configuration write request transaction layer packet 236, the PCI device synthesis module 206 stores the write data to the configuration space data structure 214 of the persistent memory controller data structure 212 and generates 234 a completion transaction layer packet 240 without the payload to the host operating system or application 200. For each configuration read request transaction layer packet 236, the PCI device synthesis module 206 generates 234 a completion transaction layer packet 240 with the payload, supplied from the configuration space data structure 214 of the persistent memory controller data structure 212, to the host operating system or application 200. Base address registers (BAR) 0 and 1 in combination indicate where the persistent memory region is located in the host's address domain, and the PCI device synthesis module 206 configures the PCIe switch 112 to enable redirection of the memory request transaction layer packets intended for the persistent memory region.

In a conventional PCI device, the operating system can program the base address registers (BARS) to inform the PCI device of its address mapping by writing configuration commands to the PCI controller. In the system 100, each persistent memory controller data structure 124 has its own base address registers defined in the configuration space data structure 214. For example, if there are four hosts 104a to 104d that are associated with four persistent memory controller data structures 124a to 124d, the persistent memory controller data structure 124a has first base address registers indicating the range of addresses of the host 104a associated with the persistent memory controller data structure 124a, and the persistent memory controller data structure 124b has second base address registers indicating the range of addresses of the host 104b associated with the persistent memory controller data structure 124b, etc.

Step 10: A memory write request transaction layer packet includes a header and a payload (write data). The header has information about the destination address where the payload is intended to be stored. The random access memory 120 functions as cache memory, and the memory space data structure 216 has information about a mapping between cache memory addresses and the addresses in the NVMe solid state drives 106. For a memory write request transaction layer packet that requests data be stored at address ADDR1_PM of the prefetchable persistent memory region, the cache management module 208 accesses the memory space data structure 216 to determine the address ADDR1_RAM in the random access memory 120 that corresponds to the address ADDR1_PM. The cache management module 208 stores the write data at the address ADDR1_RAM in the random access memory 120. When a writeback cache is implemented, the cache management module 208 sends block input/output requests to the lower layer in order to store the write data in certain blocks of the NVMe solid state drive 106.

For a memory read request transaction layer packet that requests retrieval of data from address ADDR2_PM of the prefetchable persistent memory region, the cache management module 208 accesses the memory space data structure 216 to determine the address ADDR2_RAM in the random access memory 120 that corresponds to the address ADDR2_PM. The cache management module 208 retrieves the read data from the address ADDR2_RAM in the random access memory 120, and sends a completion transaction layer packet with the payload (the read data) to the host operating system or application 200. In the event of a cache miss, the cache management module 208 sends block input/output requests to the lower layer in order to retrieve the read data from certain blocks of the NVMe solid state drive 106.

Step 11: If the lower layer is the software RAID driver 222, the software RAID driver 222 in turn divides the block input/output requests into smaller requests and submits the smaller requests to the member disk. If the lower layer is the NVMe controller memory buffer cache driver 224 or the member disk is a controller memory buffer cache 218, the NVMe controller memory buffer cache driver 224 either stores the write data to the associated controller memory buffer or passes the block input/output requests to NVMe driver 220.

Step 12: The NVMe driver 220 initiates NVMe solid state drives 106 to move data into or out of the block input/output request buffers.

Figure 4:
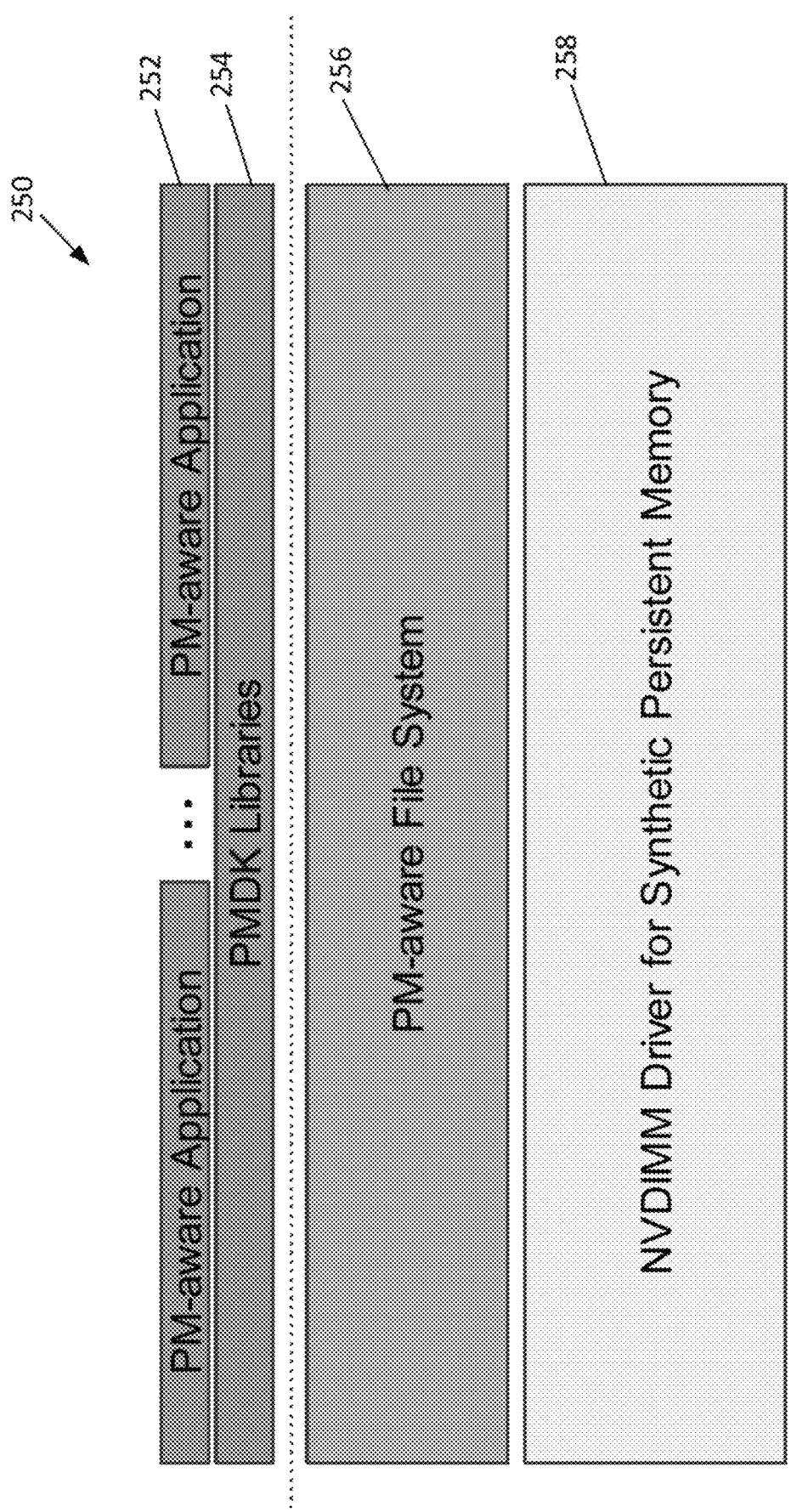
FIG. 4 is a diagram of an example host side software stack

FIG. 4 is a diagram of an example host side software stack 250. At the top of the stack 250 are persistent memory-aware applications 252, which uses function calls provided by persistent memory development kit (PMDK) libraries 254 to access the persistent memory. The persistent memory-aware application 252 corresponds to the host application 200 in FIG. 3. The next layer is the persistent memory-aware file system 256 that includes operating system built-in components. The bottom layer is the non-volatile dual in-line memory module driver for synthetic persistent memory 258, which implements the functions described in this document to allow the persistent memory-aware applications 252 to access the NVMe solid state drives 106 as if accessing non-volatile dual in-line memory modules. The non-volatile dual in-line memory module driver 258 registers the persistent memory region of the persistent memory controller data structure 124 with the operating system so that applications may know its existence and use it.

Figure 5:
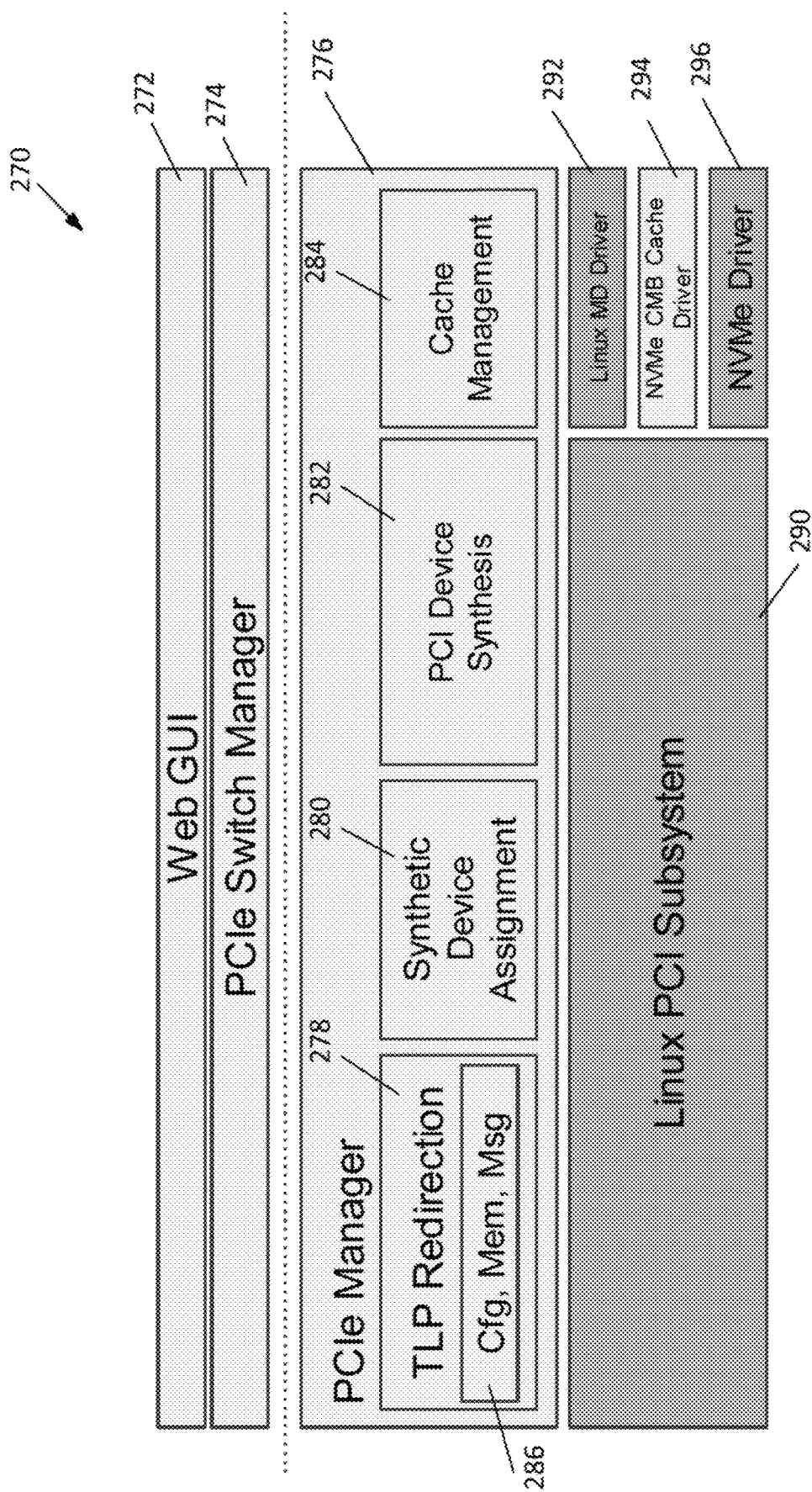
FIG. 5 is a diagram of an example software stack at the PCIe switch side.

FIG. 5 is a diagram of an example software stack 270 at the PCIe switch side, in which the software is executed at the management central processing unit 114. At the top of the stack 270 is a web GUI 272 that allows a user to modify configurations of the system 100. A second layer is a PCIe switch manager 274. A third layer is a PCIe manager 276, which includes the transaction layer packet redirection module 278, the synthetic device assignment module 280, the PCI device synthesis module 282, and the cache management module 284. The synthetic device assignment module 280, the PCI device synthesis module 282, and the cache management module 284 in FIG. 5 correspond to the synthetic device assignment module 210, the PCI device synthesis module 206, and the cache management module 208 in FIG. 2. The transaction layer packet redirection module 278 is responsible for redirecting configuration, memory, and message transaction layer packets 286. A fourth layer includes a Linux PCI subsystem 290, a Linux MD driver 292, an NVMe controller memory buffer cache driver 294, and an NVMe driver 296. The transaction layer packet redirection module 278, NVMe controller memory buffer cache driver 294, and NVMe driver 296 correspond to the transaction layer packet redirection module 204, NVMe controller memory buffer cache driver 224, and the NVMe driver 220 of FIG. 3. The Linux PCI subsystem 290, the Linux MD driver 292, and the NVMe driver 296 are built-in components of the Linux operating system. The web GUI 272, the PCIe switch manager 274, the PCIe manager 276, the transaction layer packet redirection module 278, the synthetic device assignment module 280, the PCI device synthesis module 282, and the cache management module 284 can be implemented based on the techniques described in this document.

In some implementations, the standard type 0 configuration space header, the PCI express capability structure, the PCI power management capability structure, and the advanced error reporting (AER) extended capability structure are implemented, and the other registers are reserved. The base address registers 0/1 are combined to form a 64-bit prefetchable persistent memory region, and the other BARs are reserved. In the examples described in this document, the persistent memory is prefetchable, meaning that reading data from the persistent memory will not change the data value stored in the persistent memory.

The system 100 provides persistent memory to the hosts 104 in a way that has many improvements over a conventional system that provides remote persistent memory through a network fabric, e.g., InfiniBand network fabric, or by use of the CDMA (remote direct memory access) over Converged Ethernet (RoCE) protocol. In the conventional system, to access remote persistent memory through a network, the host device typically uses Put and Get operations. The host device prepares a local buffer, the Get instruction copies remote persistent memory data to the local buffer, and the Put instruction copies local buffer data to the remote persistent memory. In order to send the Put and Get instructions through the communication network, the instructions goes through the various layers of the communication protocol at both the sender and the receiver, so there is considerable delay. The communication protocol stack may include, e.g., the physical layer, the data link layer, the network layer, the transport layer, the session layer, the presentation layer, and the application layer, as specified by the open systems interconnection (OSI) model established by the International Organization for Standardization (ISO). By comparison, in the system 100, the host 104 accesses data persistently stored in the NVMe solid state drives 106 using the PCIe protocol, which only has three layers: the physical layer, the data link layer, and the transaction layer. Accessing the persistent memory in the system 100 is much faster than accessing remote persistent memory through a network fabric in the prior art system.

FIG. 6 is a diagram that shows persistent memory as seen by a host operating system or application program 200. The PCI memory space 340 includes the address space 342 of the random access memory of the host 104 and the prefetchable persistent memory region 344. In this example, the random access memory of the host 104 is 4 GB or less, so the prefetchable persistent memory region is above 4 GB. The size of the prefetchable persistent memory region 344 can be configured when the prefetchable persistent memory region 344 is generated. The host 104 is not aware of the random access memory 120, which is accessible to the management central processing unit 114.

Each host 104 has its own PCI memory space and its own persistent memory region, and the persistent memory regions of different hosts 104 start at different addresses. Each host can access to the persistent memory independently of the other hosts. Two or more hosts can have persistent memory regions that are mapped to the logical block address space of the same solid state drive or the same RAID formed by multiple solid state drives. For example, the lower half address space of a solid state drive or a RAID can be allocated as the persistent memory region of a first host, and the upper half address space of the solid state drive or the RAID can be allocated as the persistent memory region of a second host. The prefetchable persistent memory region 344 is located within a particular host's own PCI memory space 340, and is only accessed by that particular host 104.

Figure 7:
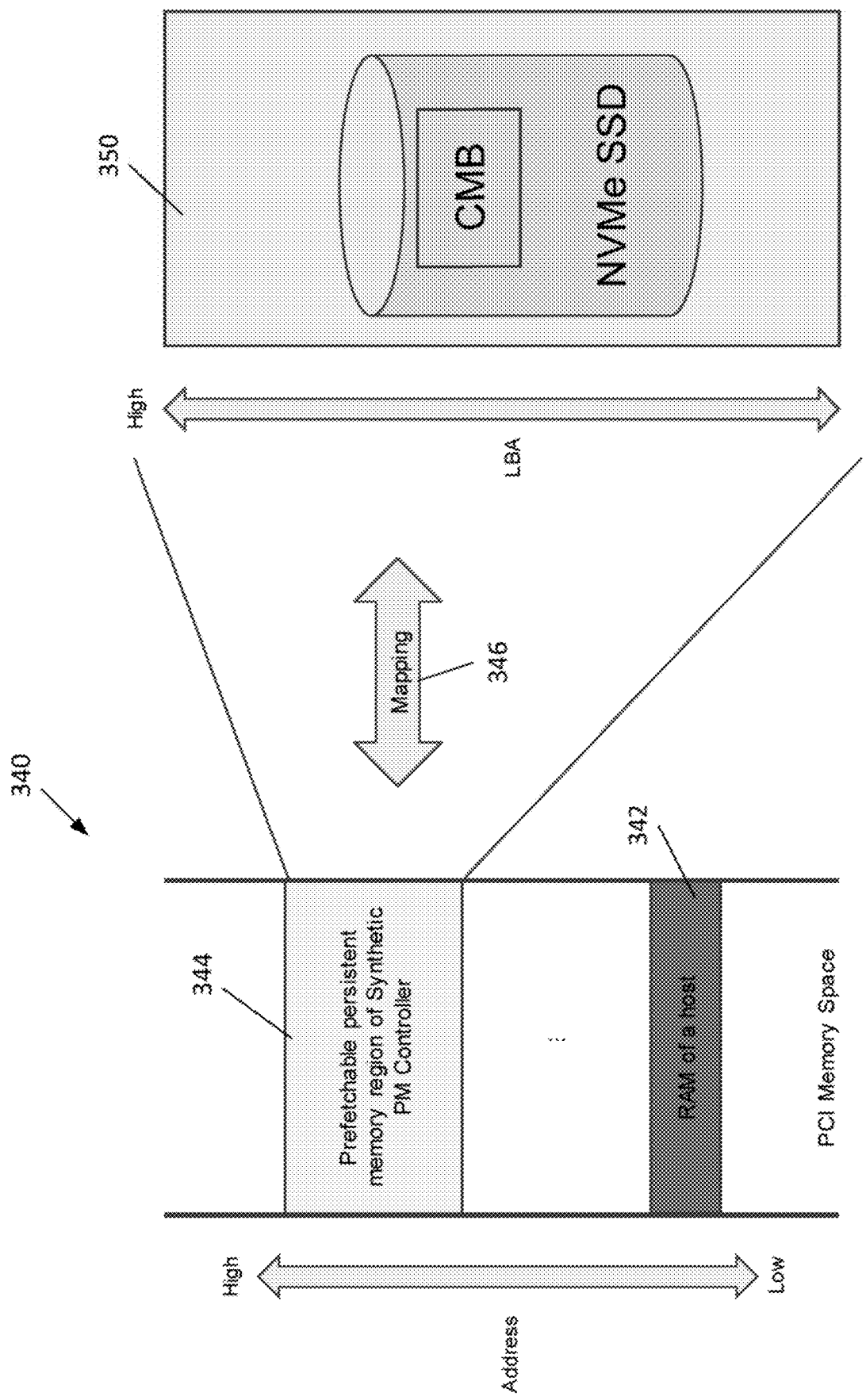
FIG. 7 is a diagram that shows an example mapping between the address space of persistent memory and the address space of a single Non-Volatile Memory Express (NVMe) solid state drive.

FIG. 7 is a diagram that shows the PCI memory space 340 and a mapping 346 between the persistent memory as seen by a host operating system or application program 200 and the address space 350 of a single NVMe solid state drive 106. Each address of the prefetchable persistent memory region 344 has a one-to-one mapping to every byte of a block address of the NVMe solid state drive address space 350. If there are multiple hosts, then a portion of the address space 350 of the NVMe solid state drive 106 is mapped to the prefetchable persistent memory region 344 of each host 104, and different portions of the address space 350 of the NVMe solid state drive 106 are mapped to the prefetchable persistent memory regions 344 of different hosts 104.

Figure 8:
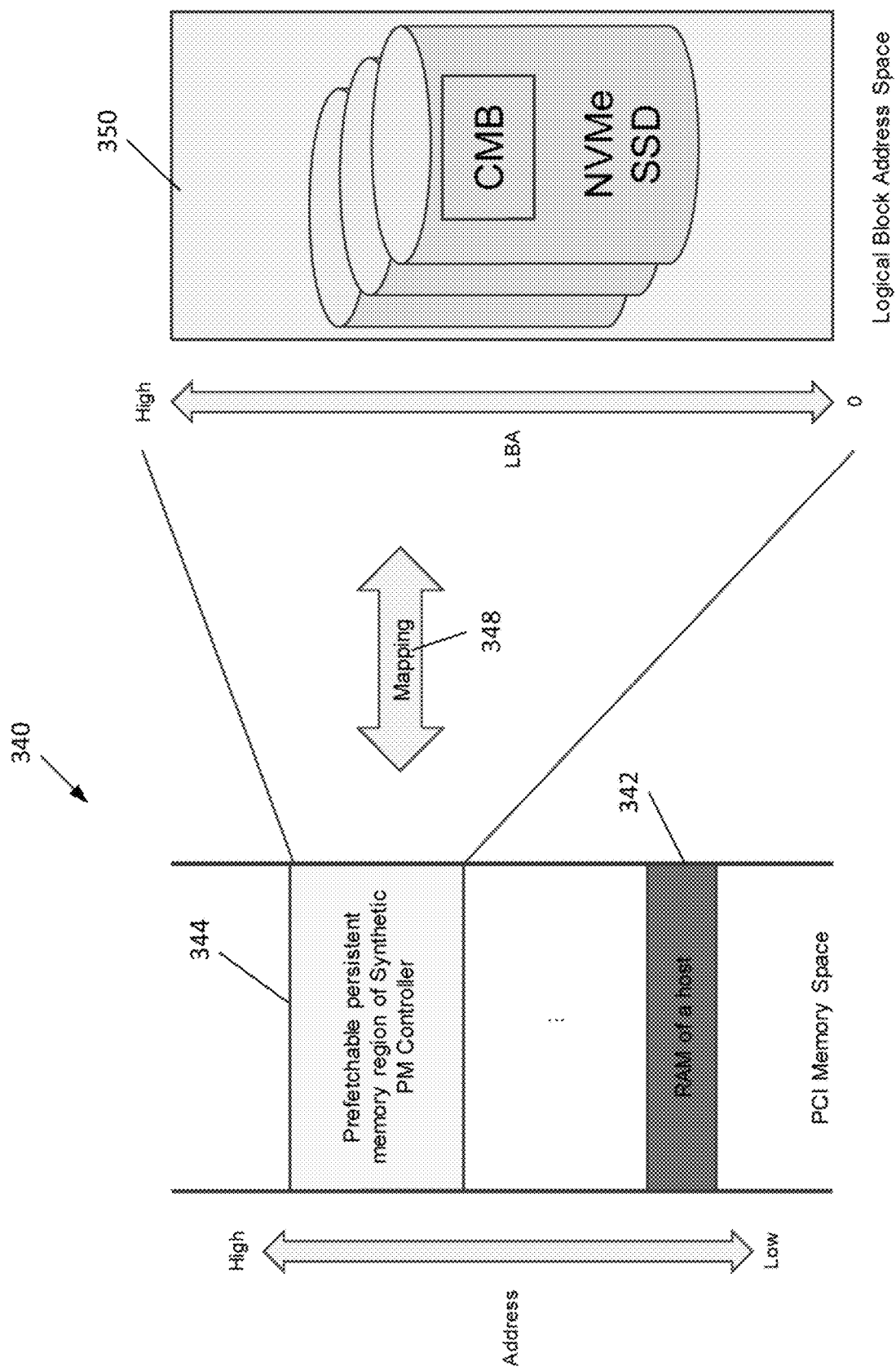
FIG. 8 is a diagram that shows an example mapping between the address space of persistent memory and the address space of multiple NVMe solid state drives.

FIG. 8 is a diagram that shows the PCI memory space 340 and a mapping 348 between the persistent memory as seen by a host operating system or application program 200 and the address space 360 of multiple NVMe solid state drive 106. Each address of the prefetchable persistent memory region 344 has a one-to-one mapping to every byte of a block address of the NVMe solid state drive address space 360 established by the multiple NVMe solid state drives 106.

If there are multiple hosts, then a portion of the address space 360 of the multiple NVMe solid state drives 106 is mapped to the prefetchable persistent memory region 344 of each host 104, and different portions of the address space 360 of the NVMe solid state drives 106 are mapped to the prefetchable persistent memory regions 344 of different hosts 104.

Figure 9:
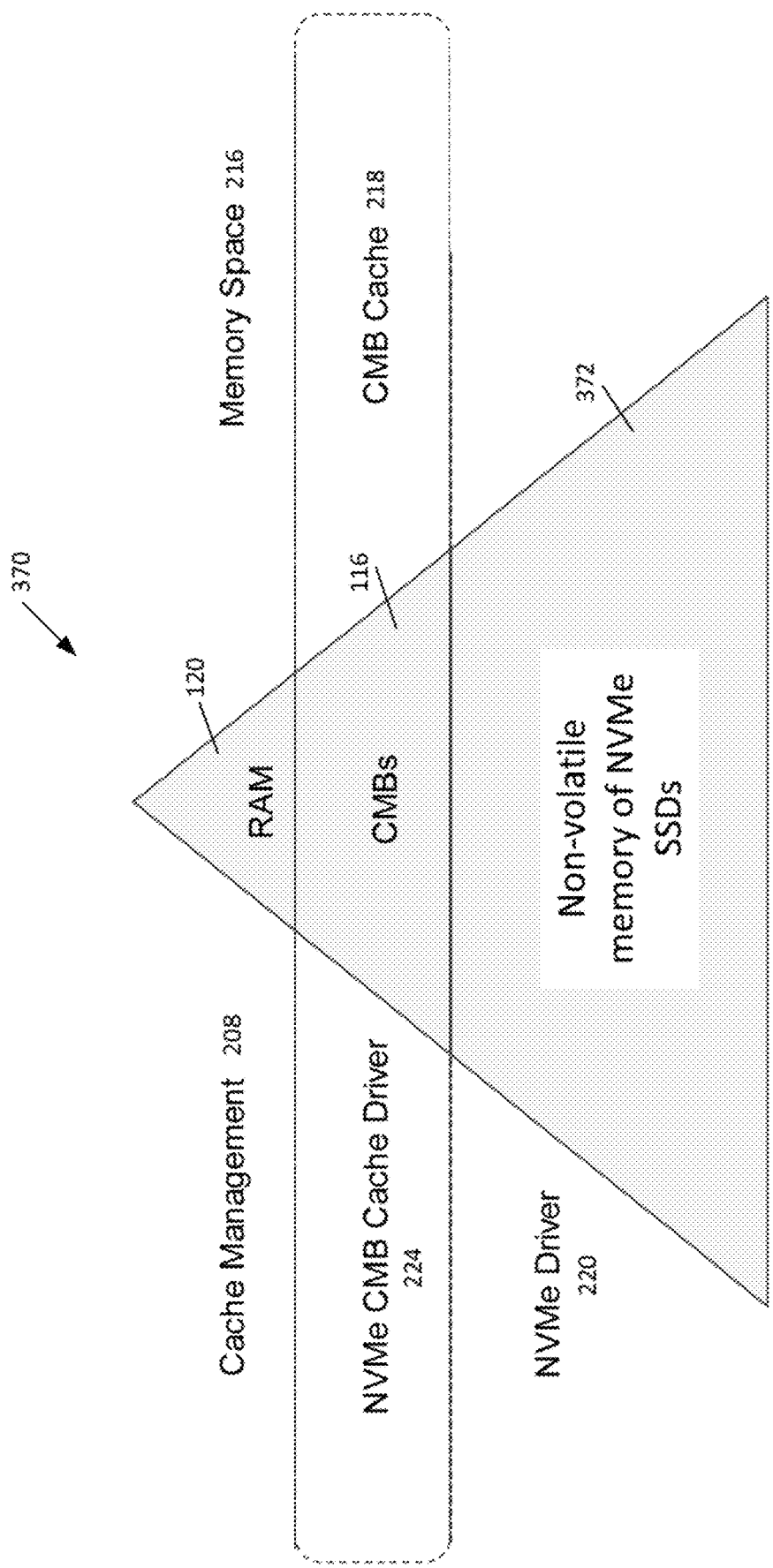
FIG. 9 is a diagram showing an example hierarchy of storage devices, including random access memory, controller memory buffer, and NVMe solid state drive.

Referring to FIG. 9, in some implementations, the data storage of the system 100 includes random access memory 120 and non-volatile memory 372 of the NVMe solid state drives 106, which optionally may include controller memory buffers 116. In some examples, the total capacity of the non-volatile memory of the NVMe solid state drives 106 is larger than the total capacity of the controller memory buffers 116, which is larger than the capacity of the random access memory 120. The random access memory 120 is accessed by the cache management module 208 based on information in the memory space data structure 216. The controller memory buffers 116 are accessed by the NVMe controller memory buffer cache driver 224 based on the information in the controller memory buffer cache data structure 218. The non-volatile memory of the NVMe solid state drive 106 is accessed by the NVMe driver 220.

The following describes how to manage the random access memory 120 and optionally the controller memory buffer 116 as cache memory. In some implementations, the cache granularity in the random access memory 120 and the controller memory buffer 116 is equal to the page size of memory management unit (MMU) of the management central processing unit 114. A page of data in the random access memory or controller memory buffer can be "dirty," "clean," "busy," or "free." When a page is "dirty," the page has data that are not consistent with its copy in the underlying block device (e.g., NVMe solid state drive 106). When a page is "clean," the page has data that are consistent with its copy in the underlying block device. When a page is "busy," the page has data that are being copied either from or to the underlying block device. When a page is "free," the page is ready to be used for caching.

The controller memory buffer cache 218 is implemented as a block device that is stacked on top of one single NVMe solid state drive with controller memory buffer, and also as a write-back cache of the NVMe solid state drive. The memory space 216 is implemented as a write-back cache of a block device which may be a single NVMe solid state drive 106 without controller memory buffer. The memory space 216 can also be stacked on top of another block device, such as a RAID volume or a controller memory buffer cache.

The memory space 216 maintains a list of least-recently-used (LRU) dirty random access memory pages, a list of least-recently-used clean random access memory pages, and a list of free random access memory pages. When no free random access memory page is available but there is at least one clean random access memory page, the least recently used clean random access memory page is removed out of the memory space 216 and moved to the list of the free random access memory pages. When the number of free random access memory pages is less than or equal to a lower bound, the memory space 216 starts to build and submit block write requests to the underlying block device. Each block write request includes a least recently used dirty random access memory page that is removed from the list of least-recently-used dirty random access memory pages and marked as busy. The number of block write requests is selected so that the number of busy random access memory pages plus the number of free random access memory pages is greater than or equal to an upper bound. After such a block write request is successfully completed, the busy random access memory page is marked as clean and added to the head of the list of least-recently-used clean random access memory pages, unless it is no longer in the memory space 216. If the clean random access memory page is no longer in the memory space 216, it is added to the list of free random access memory pages.

Each memory request transaction layer packet entering the memory space 216 is divided into one or more page-grained sub-requests. For each sub-request, if there is neither free nor clean random access memory page, a cache miss must wait until a free random access memory page is available. If a free random access memory page is available, a cache miss first removes the page from the list of free random access memory pages, marks the page as busy, inserts the page into the memory space 216, and builds and submits a block read request with the page to the underlying block device. When the block read request is successfully completed, a read miss marks the page as clean, adds the page to the tail of the list of least-recently-used clean random access memory pages, and generates a completion transaction layer packet with the requested data from the page as the payload. A write miss copies the write data to the page, marks that page as dirty, and adds the page to the tail of the list of least-recently-used dirty random access memory pages. A write hit on a busy page waits until the busy page is not busy. A write hit (on a dirty or clean page) copies the write data to the cached page. If the write hit is on a clean page, the page is marked as dirty and moved to the tail of the list of least-recently-used dirty random access memory pages. A read hit generates a completion transaction layer packet with the requested data from the cached page as the payload.

The controller memory buffer cache 218 maintains a list of least-recently-used dirty controller memory buffer pages, a list of least-recently-used clean controller memory buffer pages, and a list of free controller memory buffer pages. When no free controller memory buffer page is available but there is at least one clean controller memory buffer page, the least recently used clean controller memory buffer page is removed out of the controller memory buffer cache 218 and moved to the list of free controller memory buffer pages. When the number of free controller memory buffer pages is less than or equal to a lower bound, the controller memory buffer cache 218 starts to build and submit block write requests to the underlying NVMe solid state drive 220. Each block write request has a least recently used dirty controller memory buffer page that is removed from the list of least-recently-used dirty controller memory buffer pages and marked as busy. The number of block write requests is selected so that the number of busy controller memory buffer pages plus the number of free controller memory buffer pages is greater than or equal to an upper bound. After such a block write request is successfully completed, the busy controller memory buffer page is marked as clean and added to the head of the list of least-recently-used clean controller memory buffer pages if the controller memory buffer page is still in the controller memory buffer cache 218. If the controller memory buffer page is no longer in the controller memory buffer cache 218, the controller memory buffer page is added to the list of free controller memory buffer pages.

Each block input/output request entering the controller memory buffer cache 218 is divided into one or more page-grained sub-requests. For each sub-request, if there is neither free nor clean controller memory buffer page, a write miss submits the sub-request to the underlying NVMe solid state drive 106. If there is a free or clean controller memory buffer page, a write miss inserts to the controller memory buffer cache 218 a free controller memory buffer page, which is marked as dirty and moved to the tail of the list of least-recently-used dirty controller memory buffer pages, and the write data is copied into that controller memory buffer page. A read miss reads the requested data from the underlying NVMe solid state drive 106 into the random access memory page supplied by the sub-request. A write hit on a busy page removes the page out of controller memory buffer cache 218, and in turn submits the sub-request to the underlying NVMe solid state drive 106. A write hit on a dirty or clean page moves the cached controller memory buffer page to the tail of the list of least-recently-used dirty pages, and copies the write data to the cached controller memory buffer page. The clean controller memory buffer page is marked as dirty before it is moved to the tail of the list of least-recently-used dirty controller memory buffer pages. A read hit copies the cached data to the random access memory page supplied by the sub-request.

The following describes non-maskable interrupt handling upon system power failure. A non-maskable interrupt handling process is performed to ensure that the data stored in the random access memory 120 and the controller memory buffer 116 are safely stored in the NVMe solid state drive 106 when the power is lost.

Step 1: Upon system power failure, the non-maskable interrupt handler 232 disables the PCIe link of every upstream port so that there will not be further PCIe traffic from a connected host.

Step 2: The non-maskable interrupt handler 232 disables the write cache (e.g., 384 of FIG. 10) of every NVMe solid state drive if it has a write cache.

Step 3: Flush the write data of any redirected memory write transaction layer packet to the memory space, and ignore any other types of transaction layer packets.

Step 4: Based on the information in the memory space data structure 216, flush the write data in the random access memory 120 to its underlying block device.

Step 5: Based on the information in the controller memory buffer cache data structure 218, flush the write data in the controller memory buffer cache 116 to its underlying NVMe solid state drive.

The following describes a process for handling controller memory buffer error correction code error.

Step 1: The management central processing unit 114 receives an advanced error reporting interrupt, as a result of a controller memory buffer error correction code error.

Step 2: The management central processing unit 114 detects that an uncorrectable internal error was signaled by a certain NVMe solid state drive.

Step 3: The management central processing unit 114 sends a non-fatal error message transaction layer packet, with the associated persistent memory controller data structure 124 as requester ID, and reports uncorrectable internal error, to the associated host.

Step 4: The management central processing unit 114 flushes and disables the associated controller memory buffer cache 218.

Step 5: The management central processing unit 114 drops any subsequent memory write request transaction layer packet from the associated host, sends a non-fatal error message transaction layer packet, and reports unsupported request, to that host.

We have described an example system for enabling software-defined persistent memory that allows an operating system or an application program executing on a host device 104 to access block-addressable storage devices, such as the NVMe solid state drive 106, in a manner similar to accessing byte-addressable memory devices, such as non-volatile dual in-line memory modules. In this example, the PCIe switch 112 receives a first set of commands from the host device 104, in which the first set of commands are configured to access a byte-addressable memory device, such as a non-volatile dual in-line memory module. The PCIe switch 112 redirects the first set of commands to the management central processing unit 114, which based on the first set of commands generates a second set of commands for accessing the cache memory in the random access memory 120 and a third set of commands for accessing the block-addressable storage devices, such as the NVMe solid state drives 106. From the host's point of view, the host 104 is accessing byte-addressable persistent memory devices, even though the data is stored in block-addressable non-volatile storage devices. The management central processing unit 114 and the PCIe switch 112 in combination with the NVDIMM driver 258 provide a software layer that hides the complexities of implementing persistent memory using the block-addressable non-volatile storage devices (e.g., NVMe solid state drives 106) and caching data using the random access memory 120 and optionally the CMB 116.

Figure 10:
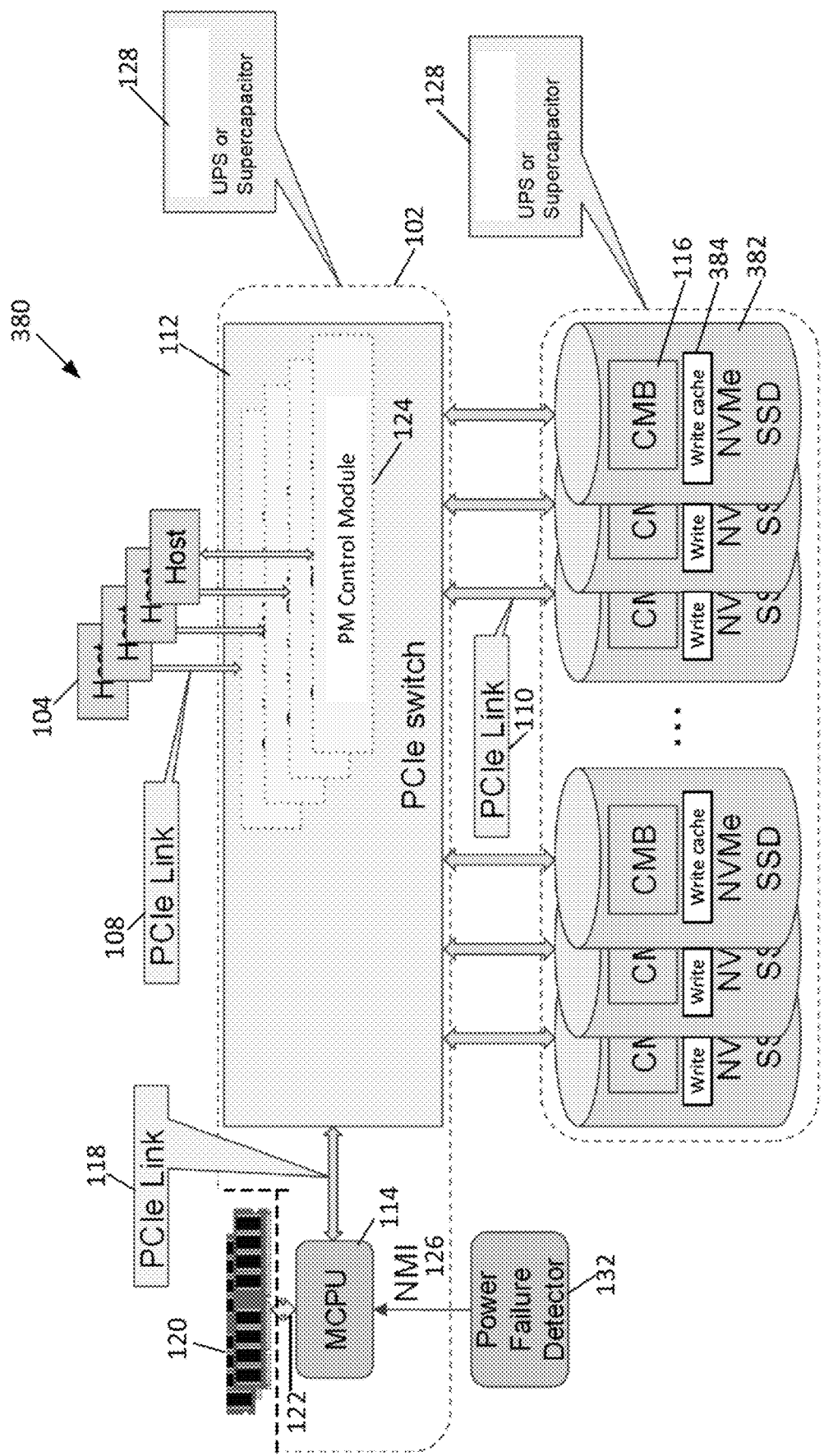
FIG. 10 is a diagram of an example computing system having persistent memory.

Referring to FIG. 10, in some implementations, a system 380 enables hosts 104 to access block-addressable storage devices, such as NVMe solid state drivers 382, in a manner similar to accessing byte-addressable memory devices, such as non-volatile dual in-line memory modules. The system 380 is similar to the system 100, except that each of at least some of the NVMe solid state drives 382 has a write cache 384. The NVMe solid state drive 382 includes dynamic random access memory, a portion of the dynamic random access memory is used as the controller memory buffer 116, and a portion of the dynamic random access memory is used as the write cache 382. The write cache 382 operates independently of the cache memory in the random access memory 120. When flushing data from the cache memory in the random access memory 120 to the NVMe solid state drive 382, the data are first transferred from the random access memory 120 to the write cache 384 of the NVMe solid state drive 382, then from the write cache 384 to the non-volatile memory of the NVMe solid state drive 382.

In the system 380, the mapping between the address space of persistent memory and the address space of a single NVMe solid state drive, and the mapping between the address space of persistent memory and the address space of multiple NVMe solid state drives, are similar to those shown in FIGS. 7 and 8, except that each of the NVMe solid state drive 350 includes a write cache.

In some implementations, the software modules and drivers (e.g., those shown in FIG. 3) for implementing software-defined persistent memory can be provided on computer-readable media (e.g., RAM, ROM, SDRAM, hard disk, optical disk, and flash memory). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire, fiber optics and free space.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., general purpose microprocessors, special purpose microprocessors, digital signal processors, single-core or multi-core processors, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM, DVD-ROM, and Blu-ray BD-ROM disks. The processor and the memory can be supplemented by, or incorporated in, ASICs (application-specific integrated circuits).

Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or in sequential order, to achieve desirable results. In certain implementations, multitasking and parallel processing may be advantageous.

Although some examples have been discussed above, other implementations and applications are also within the scope of the following claims. For example, the host applications 200 in FIG. 3 can be artificial intelligence applications (e.g., deep learning neural networks) and complex simulations executing on general-purpose graphics processing units that process large amounts of data. For example, the host applications 200 in FIG. 3 can be video rendering programs, audio signal processing programs, animation rendering programs, image processing programs, machine learning programs, mathematical simulation programs, application programs for controlling vehicles, application programs for controlling robots, big data application programs, application programs for processing financial data, application programs for processing health care data, data encryption and decryption application programs, application programs for performing complex physics computations, and/or application programs for processing medical data. The host operating system can be, e.g., Windows operating system, Linux operating system, or MacOS. The multiple hosts 104 in FIG. 1 can be multiple general-purpose graphics processing units operating in parallel to increase performance. The hosts 104 can be different from what is described above.

In some implementations, the NVMe solid state drives 106 and 382 can be replaced with other types of solid state drives. The non-volatile memory used in the solid state drives can be based on various types of technology, including e.g., single-level cell flash memory, triple-level cell flash memory, and/or multi-level cell flash memory.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. An apparatus comprising:
  a central processing unit;
  one or more first input/output ports configured to receive one or more random access memory (RAM) modules each having random access memory, in which the one or more first input/output ports are electrically coupled to a memory bus that is accessible to the central processing unit;
  one or more second input/output ports configured to receive one or more block-addressable non-volatile storage devices; and
  an interface switch configured to communicate with one or more host devices through one or more first data links, in which the central processing unit and the interface switch are configured to generate, for each host device, a persistent memory controller data structure that is associated with the corresponding host device,
  wherein the central processing unit and the interface switch are configured emulate a persistent memory controller when interacting with the corresponding host device,
  wherein the persistent memory controller data structure includes configuration data to enable the central processing unit and the interface switch to emulate the persistent memory controller;
  wherein the central processing unit and the interface switch are configured to receive instructions from the one or more host devices and persistently store write data in the one or more block-addressable non-volatile storage devices or retrieve read data from the one or more block-addressable non-volatile storage devices based on the instructions from the one or more host devices, and use at least a portion of the corresponding random access memory as cache memory to temporarily store at least one of the read data from the one or more block-addressable non-volatile storage devices or the write data intended to be persistently stored in the one or more block-addressable non-volatile storage devices.

2. The apparatus of claim 1 in which the instructions from the host device comprise instructions designed to access a byte-addressable persistent memory module.

3. The apparatus of claim 1 in which the first data links comprise at least one of PCIe links, Thunderbolt™ links, NVLinks, CCIX links, OpenCAPI links, or Gen-Z links.

4. The apparatus of claim 1 in which the one or more block-addressable non-volatile storage devices communicate with the interface switch or the central processing unit through at least one of PCIe links, Thunderbolt™ links, NVLinks, CCIX links, OpenCAPI links, or Gen-Z links.

5. The apparatus of claim 1 in which the first data links comprise PCIe links, the one or more block-addressable non-volatile storage devices communicate with the interface switch or the central processing unit through PCIe links, and the interface switch comprises a PCIe switch.

6. The apparatus of claim 5 in which the central processing unit is configured to, upon receiving an interrupt signal indicating power failure, perform an emergency shutdown process that includes flushing cached data to the one or more block-addressable non-volatile storage devices.

7. The apparatus of claim 6 in which the emergency shutdown process comprises flushing write data of memory write transaction layer packets to PCI memory space.

8. The apparatus of claim 7 in which the emergency shutdown process comprises flushing data in PCI memory space to at least one corresponding non-volatile storage device.

9. The apparatus of claim 1 in which the one or more block-addressable non-volatile storage devices comprise NVM Express® solid state drives.

10. The apparatus of claim 1 in which each of at least one of the one or more block-addressable non-volatile storage devices comprises a controller memory buffer (CMB) implemented using dynamic random access memory, a portion of the random access memory is configured as controller memory buffer cache, and the central processing unit and the interface switch are configured to use the cache memory and the controller memory buffer cache to temporarily store the read data and/or the write data.

11. The apparatus of claim 10 in which the central processing unit generates a controller memory buffer cache data structure in the random access memory, and the controller memory buffer cache data structure includes information about a corresponding controller memory buffer and a location in the controller memory buffer where cache data is stored.

12. The apparatus of claim 1 in which the persistent memory controller data structure further comprises a configuration space data structure and a memory space data structure,
  the configuration space data structure is configured to store payloads of configuration write request transaction layer packets and provide data requested by configuration read request transaction layer packets, and the memory space data structure records information about, for a given persistent memory controller data structure, a location in random access memory of a cache memory that stores data for at least one of the one or more block-addressable non-volatile storage devices.

13. The apparatus of claim 1 in which the central processing unit comprises a memory management unit (MMU) that divides an address space into pages, the cache memory in the random access memory is divided into pages, and a page size in the cache memory is the same as a page size used by the memory management unit.

14. The apparatus of claim 13 in which the central processing unit generates a memory space data structure that includes a list of least-recently-used (LRU) dirty random access memory pages, a list of least-recently-used clean random access memory pages, and a list of free random access memory pages.

15. The apparatus of claim 14 in which the interface switch comprises a PCIe switch, the central processing unit and the PCIe switch are configured to manage cache memory according to a cache memory management process comprising:
   upon determining no free random access memory page is available but there is at least one clean random access memory page, removing the least recently used clean random access memory page out of the memory space and moving the random access memory page to the list of the free random access memory pages.

16. The apparatus of claim 14 in which the interface switch comprises a PCIe switch, the one or more block-addressable non-volatile storage devices comprise NVMe solid state drives, and the central processing unit and the PCIe switch are configured to manage cache memory according to a cache memory management process comprising:
   receiving a memory request transaction layer packet;
   generating one or more page-grained sub-requests based on the memory request transaction layer packet;
   for each sub-request, when there is cache miss, if there is no free or clean random access memory page, waiting until a free random access memory page is available, and if a free random access memory page is available, removing the random access memory page from the list of free random access memory pages, marking the random access memory page as busy, inserting the random access memory page into the memory space, and submitting a block read request with the page to the NVMe solid state drive.

17. An apparatus comprising:
   at least one processor;
   an interface switch that is configured to be electrically coupled to at least one host device through a first data link, in which the at least one processor and the interface switch are configured to generate a data structure to enable an application program executing on the at least one host device to access at least one block-addressable storage device electrically coupled to the interface switch or the at least one processor through a second data link using a first command configured to access a byte-addressable memory device, and use random access memory as cache memory;
   wherein the at least one processor is configured to receive the first command from the at least one host device, generate a second command configured to access the at least one block-addressable storage device, and send the second command to the at least one non-volatile block-addressable storage device.

18. The apparatus of claim 17 in which the first data link comprises a PCIe link, the second data link comprises a PCIe link, and the at least one non-volatile block-addressable storage device comprises at least one NVMe solid state drive.

19. A method for managing software-defined persistent memory, the method comprising:
   at a central processing unit, generating a data structure that enables a host device to access one or more non-volatile storage devices using commands designed to access persistent memory, in which the data structure includes information about a mapping between cache memory addresses and a plurality of addresses in the one or more non-volatile storage devices, and the cache memory addresses correspond to random access memory addresses; and
   at the central processing unit, upon receiving a first read command from the host device in which the first read command is designed to retrieve data from a first address of the persistent memory, determining a second address of a cache memory that corresponds to the first address of the persistent memory based on the information about the mapping between the cache memory addresses and the addresses in the one or more non-volatile storage devices, retrieving data from the second address of the cache memory, and sending the retrieved data to the host device.

20. The method of claim 19, comprising:
   at the central processing unit, upon receiving a first write command from the host device in which the first write command is designed to write data to a third address of the persistent memory, determining a fourth address of the cache memory that corresponds to the third address of the persistent memory based on the information about the mapping between the cache memory addresses and the addresses in the one or more non-volatile storage devices, and writing data to the fourth address of the cache memory.

* * * * *